(12) United States Patent
Chujoh et al.

(10) Patent No.: US 11,297,349 B2
(45) Date of Patent: Apr. 5, 2022

(54) VIDEO DECODING DEVICE AND VIDEO ENCODING DEVICE

(71) Applicants: Sharp Kabushiki Kaisha, Osaka (JP); FG Innovation Company Limited, New Territories (HK)

(72) Inventors: Takeshi Chujoh, Sakai (JP); Tomohiro Ikai, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/615,424

(22) PCT Filed: May 24, 2018

(86) PCT No.: PCT/JP2018/019956
§ 371 (c)(1),
(2) Date: Nov. 21, 2019

(87) PCT Pub. No.: WO2018/221368
PCT Pub. Date: Dec. 6, 2018

(65) Prior Publication Data
US 2020/0177922 A1 Jun. 4, 2020

(30) Foreign Application Priority Data

May 31, 2017 (JP) .............................. JP2017-108758

(51) Int. Cl.
*H04N 19/70* (2014.01)
*H04N 19/172* (2014.01)
*H04N 19/176* (2014.01)
*H04N 19/50* (2014.01)

(52) U.S. Cl.
CPC ........... *H04N 19/70* (2014.11); *H04N 19/172* (2014.11); *H04N 19/176* (2014.11); *H04N 19/50* (2014.11)

(58) Field of Classification Search
CPC .............................. H04N 19/174; H04N 19/70
See application file for complete search history.

(56) References Cited

U.S. PATENT DOCUMENTS

| 2013/0016769 | A1* | 1/2013 | Chen | H04N 19/157 |
| | | | | 375/240.02 |
| 2013/0202051 | A1* | 8/2013 | Zhou | H04N 19/436 |
| | | | | 375/240.26 |
| 2015/0215631 | A1* | 7/2015 | Zhou | H04N 19/436 |
| | | | | 375/240.02 |

(Continued)

FOREIGN PATENT DOCUMENTS

JP         2015-126508 A        7/2015

OTHER PUBLICATIONS

Official Communication issued in International Patent Application No. PCT/JP2018/019956, dated Jul. 31, 2018.

(Continued)

*Primary Examiner* — Jerry T Jean Baptiste
(74) *Attorney, Agent, or Firm* — ScienBiziP, P.C.

(57) ABSTRACT

A video decoding device includes a subpicture decoder(s) configured to decode respective subpictures, and a picture combining unit configured to compose the subpictures decoded into a picture such that the subpictures are allowed to overlap with each other.

6 Claims, 24 Drawing Sheets

(56) References Cited

U.S. PATENT DOCUMENTS

2018/0270500 A1* 9/2018 Li .................... H04N 19/54
2020/0107006 A1* 4/2020 Lee .................. H04N 13/161

OTHER PUBLICATIONS

International Telecommunication Union, "High efficiency video coding", Series H: Audiovisual and Multimedia Systems, Infrastucture of audiovisual services—Coding of moving video, H.265, Dec. 2016, 662 pages.

* cited by examiner

| seq_parameter_set_rbsp( ) { | Descriptor |
|---|---|
|   sps_video_parameter_set_id | u(4) |
| | |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
| | |
| } | |

| sub_pic_seq_parameter_set_rbsp( ) { | Descriptor |
|---|---|
|   spsps_pic_parameter_set_id | ue(v) |
|   spsps_seq_parameter_set_id | ue(v) |
|   sub_pic_left_position | ue(v) |
|   sub_pic_top_position | ue(v) |
|   sub_pic_width_in_luma_samples | ue(v) |
|   sub_pic_height_in_luma_samples | ue(v) |
|   disp_win_flag | u(1) |
|   if( disp_win_flag ) { | |
|     disp_win_left_offset | ue(v) |
|     disp_win_right_offset | ue(v) |
|     disp_win_top_offset | ue(v) |
|     disp_win_bottom_offset | ue(v) |
|   } | |
| } | |

| pic_parameter_set_rbsp( ) { | Descriptor |
|---|---|
|   pps_pic_parameter_set_id | ue(v) |
|   pps_spseq_parameter_set_id | ue(v) |
| | |

FIG. 10

| chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

FIG. 11

| | Descriptor |
|---|---|
| seq_parameter_set_rbsp( ) { | |
|   sps_video_parameter_set_id | u(4) |
| | |
|   sub_picture_enable_flag | u(1) |
|   if( sub_pucture_enabled_flag ) { | |
|     num_sub_picture_hor_minus1 | ue(v) |
|     num_sub_picture_ver_minus1 | ue(v) |
|     uniform_spacing_flag | u(1) |
|     if( !uniform_spacing_flag ) { | |
|       for( i = 0; i < num_sub_picture_hor_minus1; i++ ) { | |
|         sub_pic_left_position [ i ] | ue(v) |
|         sub_pic_width_in_luma_samples [ i ] | ue(v) |
|         disp_win_hor_flag [ i ] | u(1) |
|         if( disp_win_hor_flag [ i ] ) { | |
|           disp_win_left_offset [ i ] | ue(v) |
|           disp_win_right_offset [ i ] | ue(v) |
|         } | |
|       } | |
|       for( i = 0; i < num_sub_picture_ver_minus1; i++ ) { | |
|         sub_pic_top_position [ i ] | ue(v) |
|         sub_pic_height_in_luma_samples [ i ] | ue(v) |
|         disp_win_ver_flag [ i ] | u(1) |
|         if( disp_win_ver_flag [ i ] ) { | |
|           disp_win_top_offset [ i ] | ue(v) |
|           disp_win_bottom_offset [ i ] | ue(v) |
|         } | |
|       } | |
|     } | |
|   } | |
| | |
| } | |

FIG. 13

| pic_parameter_set_rbsp( ) { | Descriptor |
|---|---|
|   pps_pic_parameter_set_id | ue(v) |
|   pps_seq_parameter_set_id | ue(v) |
| | |
|   sub_picture_enable_flag | u(1) |
|   if( sub_pucture_enabled_flag ) { | |
|     num_sub_picture_hor_minus1 | ue(v) |
|     num_sub_picture_ver_minus1 | ue(v) |
|     uniform_spacing_flag | u(1) |
|     if( !uniform_spacing_flag ) { | |
|       for( i = 0; i < num_sub_picture_hor_minus1; i++ ) { | |
|         sub_pic_left_position [ i ] | ue(v) |
|         sub_pic_width_in_luma_samples [ i ] | ue(v) |
|         disp_win_hor_flag [ i ] | u(1) |
|         if( disp_win_hor_flag [ i ] ) { | |
|           disp_win_left_offset [ i ] | ue(v) |
|           disp_win_right_offset [ i ] | ue(v) |
|         } | |
|       } | |
|       for( i = 0; i < num_sub_picture_ver_minus1; i++ ) { | |
|         sub_pic_top_position [ i ] | ue(v) |
|         sub_pic_height_in_luma_samples [ i ] | ue(v) |
|         disp_win_ver_flag [ i ] | u(1) |
|         if( disp_win_ver_flag [ i ] ) { | |
|           disp_win_top_offset [ i ] | ue(v) |
|           disp_win_bottom_offset [ i ] | ue(v) |
|         } | |
|       } | |
|     } | |
|   } | |
| | |
| } | |

FIG. 20

VIDEO DECODING DEVICE AND VIDEO ENCODING DEVICE

TECHNICAL FIELD

The embodiments of the disclosure relate to a video decoding device and a video encoding device.

BACKGROUND ART

A video encoding device which generates coded data by coding a video, and a video decoding device which generates decoded images by decoding the coded data are used to transmit or record a video efficiently.

For example, specific video coding schemes include methods suggested in H.264/AVC and High-Efficiency Video Coding (HEVC).

In such a video coding scheme, images (pictures) constituting a video are managed by a hierarchy structure including slices obtained by splitting images, Coding Tree Units (CTUs) obtained by splitting slices, Coding Units (CUs) obtained by splitting coding tree units, prediction units (PUs) which are blocks obtained by splitting coding units, and transform units (TUs), and the images are coded/decoded for each CU.

In such a video coding scheme, usually, prediction images are generated based on local decoded images obtained by coding/decoding input images, and prediction residuals (also sometimes referred to as "difference images" or "residual images") obtained by subtracting the prediction images from input images (original image) are coded. Generation methods for prediction images include an inter-screen prediction (inter prediction) and an intra-screen prediction (intra prediction).

Examples of a technique of recent video coding and decoding are described in Patent Literature (PTL) 1 and Non-Patent Literature (NTL) 1. In PTL 1, by utilizing layers used in scalable coding or the like in place of tiles, the tiles can be allocated at a high degree of freedom. NPL 1 discloses a technique related to Tiles of H. 265/HEVC and the like.

CITATION LIST

Patent Literature

PTL 1: JP 2015-126508 A (published on Jul. 6, 2015)

Non Patent Literature

NPL 1: ITU-T H.265, "High efficiency video coding", SERIES H: AUDIOVISUAL AND MULTIMEDIA SYSTEMS Infrastructure of audiovisual services—Coding of moving video, ISO/IEC 23008-2, December 2016

SUMMARY

Technical Problem

However, known technology as described in PTL 1 and NPL 1 fails to efficiently perform coding and decoding processing while providing high quality images.

An object of the disclosure is to efficiently perform coding and decoding processing while providing high quality images.

Solution to Problem

In order to achieve the above-described object, a video decoding device according to an aspect of the disclosure includes a subpicture decoder configured to decode respective subpictures; and a picture combining unit configured to compose the subpictures decoded into a picture such that the subpictures are allowed to overlap with each other.

In order to achieve the above-described object, a video encoding device according to an aspect of the disclosure includes a picture split unit configured to split a picture into subpictures allowed to overlap with each other; and a subpicture coder configured to code each of the subpictures.

Advantageous Effects of Invention

According to the above-described configuration, coding and decoding processing can be performed efficiently, while high-quality images can be provided.

BRIEF DESCRIPTION OF DRAWINGS

FIG. 10 is a diagram illustrating an example of syntax that is included in a subpicture sequence parameter set SSPS and referred to by a picture combining unit in the image decoding device according to Embodiment 1.

FIG. 11 is a diagram of a table illustrating values of SubWidthC and SubHeightC derived from chroma_format_idc.

FIG. 13 is a diagram illustrating another example of syntax that is included in a sequence parameter set SPS and referred to by a picture combining unit in the image decoding device according to Embodiment 1.

FIG. 20 is a diagram illustrating an example of syntax that is included in a picture parameter set PPS and referred to by a picture combining unit in the image decoding device according to Embodiment 2.

DESCRIPTION OF EMBODIMENTS

Embodiment 1

Hereinafter, embodiments of the disclosure are described with reference to the drawings.

Figure 23:
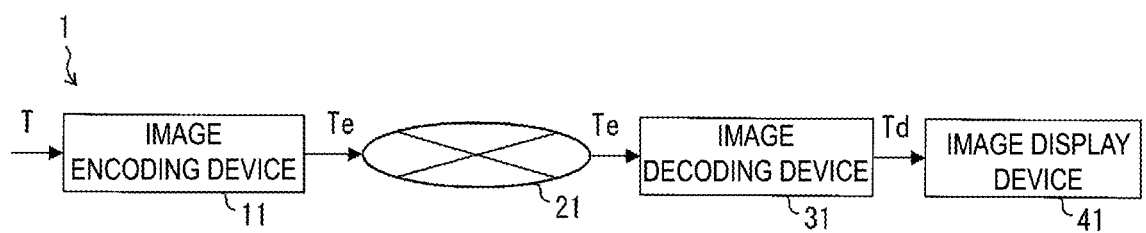
FIG. 23 is a schematic diagram illustrating a configuration of an image transmission system according to Embodiment 1.

FIG. 23 is a schematic diagram illustrating a configuration of an image transmission system 1 according to the present embodiment.

The image transmission system 1 is a system configured to transmit codes resulting from coding of an image to be coded and to decode the transmitted codes and to display an image. The image transmission system 1 includes an image encoding device (video encoding device) 11, a network 21, an image decoding device (video decoding device) 31, and an image display device 41.

An image T indicating an image of a single layer or multiple layers is input to the image encoding device 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction (simulcast), coded data can be compiled.

The network 21 transmits coding streams Te generated by the image encoding device 11 to the image decoding device 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast waves such as digital terrestrial television broadcasting and satellite broadcasting. The network 21 may be substituted by a storage medium in which the coding streams Te are recorded, such as a Digital Versatile Disc (DVD) and a Blu-ray Disc (BD).

The image decoding device 31 decodes each of the coding streams Te transmitted by the network 21, and generates one or multiple decoded images Td.

The image display device 41 displays all or some of the one or multiple decoded images Td generated by the image decoding device 31. For example, the image display device 41 includes a display device such as a liquid crystal display and an organic Electro-luminescence (EL) display. In space scalable coding and SNR scalable coding, in a case that the image decoding device 31 and the image display device 41 have a high processing capability, an enhanced layer image having high image quality is displayed. In a case that the image decoding device 31 and the image display device 41 only have lower processing capability, a base layer image which does not require a processing capability and a display capability as high as those of an enhanced layer is displayed.
Operator Operators used herein will be described below.

$>>$ is a right bit shift, $<<$ is a left bit shift, & is a bitwise AND, | is a bitwise OR, and |= is an OR assignment operator.

X? y: z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).
Structure of Coding Stream Te Prior to the detailed description of the image encoding device 11 and the image decoding device 31 according to the present embodiment, the data structure of the coding stream Te generated by the image encoding device 11 and decoded by the image decoding device 31 will be described.

Figure 1:
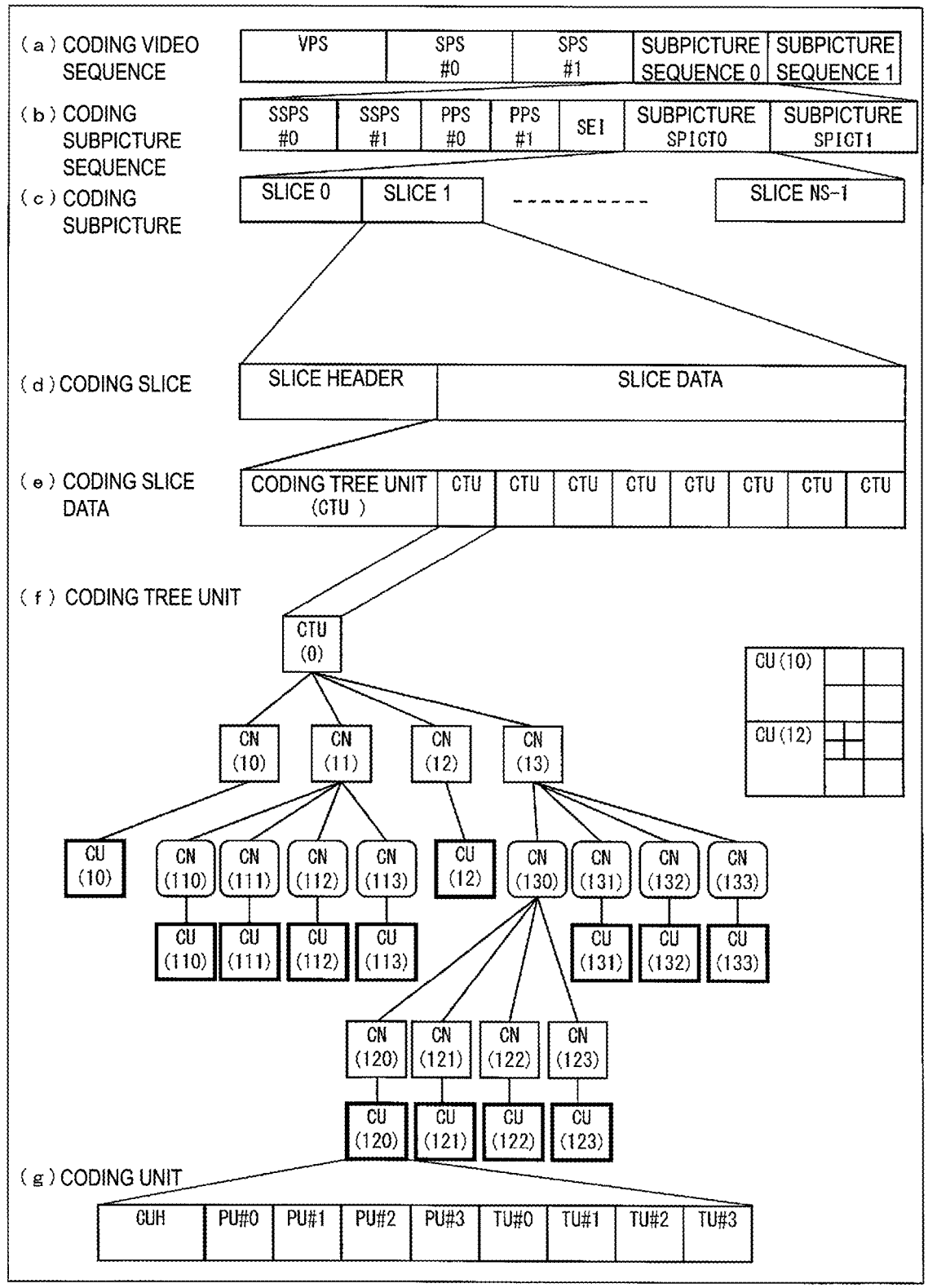
FIG. 1 is a diagram illustrating a hierarchy structure of data of a coding stream.
Figure 2:
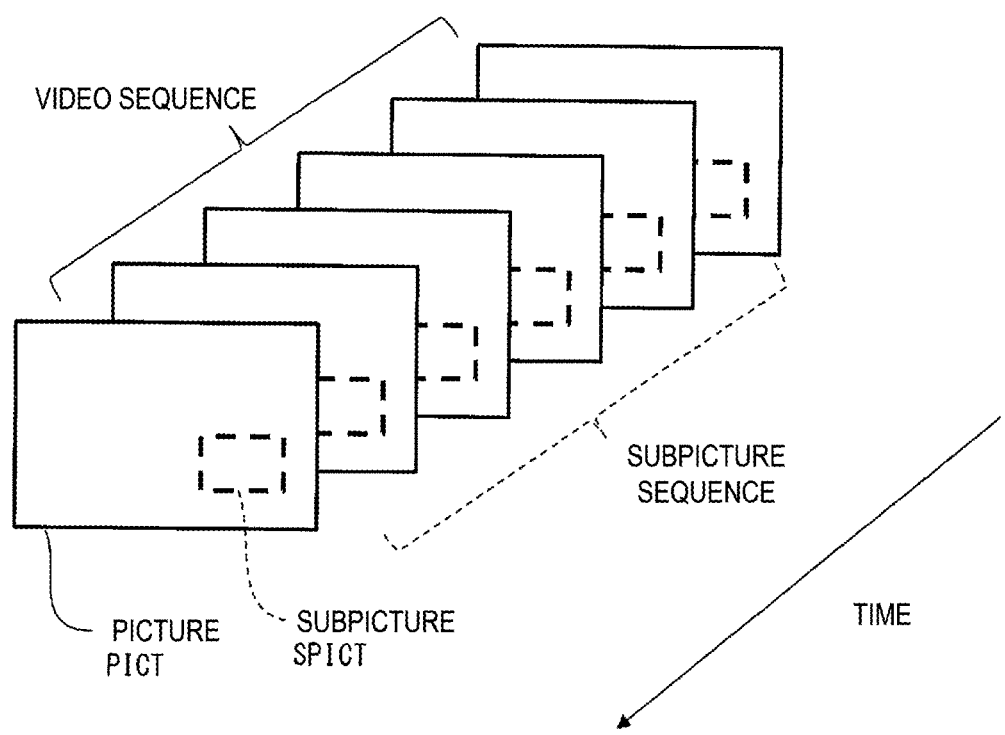
FIG. 2 is a conceptual diagram illustrating a subpicture sequence.

FIG. 1 is a diagram illustrating a hierarchy structure in the coding stream Te. The coding stream Te includes a sequence and multiple subpicture sequence constituting the sequence illustratively. (a) to (g) of FIG. 1 are diagrams illustrating a coding video sequence prescribing a sequence SEQ, a coding subpicture sequence prescribing a subpicture sequence, a coding subpicture prescribing a subpicture SPICT, a coding slice prescribing a slice S, coding slice data prescribing slice data, a coding tree unit included in coding slice data, and Coding Units (CUs) included in a coding tree unit, respectively.
Subpicture Sequence First, a description will be given of the subpicture sequence by using FIG. 2. FIG. 2 is a conceptual diagram illustrating the subpicture sequence. As illustrated in FIG. 2, the video sequence includes multiple pictures PICT continuous in a time direction. The subpicture SPICT is obtained by splitting the picture PICT, and more specifically, by splitting the picture PICT with resultant subpictures SPICT allowed to overlap with one another. The subpicture sequence includes multiple subpictures SPICT continuous in the time direction.

With such a configuration, the image decoding device 31 can efficiently decode the subpictures in parallel and independently in units of subpicture sequences. The image decoding device 31 composes the subpictures with overlapping of the subpictures allowed, to enable a reduction in difference in image quality across boundaries resulting from splitting of the screen.

Coding Video Sequence

In the coding video sequence, a set of data referred to by the image decoding device 31 to decode a video sequence SEQ to be processed is prescribed. As illustrated in (a) of FIG. 1, the sequence SEQ includes a Video Parameter Set VPS, Sequence Parameter Sets SPSs, and subpicture sequences. Here, a value indicated after # indicates a layer ID. In FIG. 1, although an example is illustrated where coded data of #0 and #1, in other words, coded data of layer 0 and layer 1 are present, the types and number of layers are not limited to these.

In the video parameter set VPS, in a video including multiple layers, a set of coding parameters common to multiple videos and a set of coding parameters associated with multiple layers and individual layers included in a video are prescribed.

In the sequence parameter set SPS, a set of coding parameters referred to by the image decoding device 31 to decode a target sequence is prescribed. For example, width and height of a picture are prescribed. Note that multiple SPSs may exist. In that case, any of multiple SPSs is selected from the SSPS.

Coding Subpicture Sequence

In the coding subpicture sequence, a set of data referred to by the image decoding device 31 to decode a subpicture sequence to be processed is prescribed. As illustrated in (b) of FIG. 1, the coding subpicture sequence includes Subpicture Sequence Parameter Sets SSPS, Picture Parameter Sets PPS, pictures PICT, Supplemental Enhancement Information SEI, and subpictures SPICT.

The subpicture sequence parameter set SSPS is a parameter set located on lower side of the sequence parameter sets SPS and located on higher side of the picture parameter sets PPS. In the subpicture sequence parameter set SSPS, a set of coding parameters referred to by the image decoding device 31 to decode each subpicture sequence in a target sequence is prescribed. For example, width and height of a subpicture are prescribed. Note that multiple SSPSs may exist. In that case, any of multiple SSPSs is selected from the PPS.

In the picture parameter set PPS, a set of coding parameters referred to by the image decoding device 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Subpicture

In the coding subpicture, a set of data referred to by the image decoding device 31 to decode a subpicture SPICT to be processed is prescribed. As illustrated in (c) of FIG. 1, the subpicture SPICT includes slices $S_0$ to $S_{NS-1}$ (NS is the total number of slices included in the subpicture SPICT). The total number of subpictures may be prescribed by limitation based on the capability of the image decoding device 31 prescribed by a profile, a level, and the like.

Note that hereinafter, in a case that the slices $S_0$ to $S_{NS-1}$ need not be distinguished from one another, subscripts of reference signs may be omitted from descriptions. The same applies to other data included in the coding stream Te described below and described with an added subscript.

Coding Slice

In the coding slice, a set of data referred to by the image decoding device 31 to decode a slice S to be processed is prescribed. As illustrated in (d) of FIG. 1, the slice S includes a slice header SH and slice data SDATA.

The slice header SH includes a coding parameter group referred to by the image decoding device 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referred to by the image decoding device 31 to decode slice data SDATA to be processed is prescribed. As illustrated in (e) of FIG. 1, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (f) of FIG. 1, a set of data referred to by the image decoding device 31 to decode a coding tree unit to be processed is prescribed. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also prescribed as the highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes, and is not split anymore. The coding unit CU is a basic unit of coding processing.

In a case that the size of the coding tree unit CTU is 64×64 pixels, the size of the coding unit may be any of 64×64 pixels, 32×32 pixels, 16×16 pixels, and 8×8 pixels.

Coding Unit

As illustrated in (g) of FIG. 1, a set of data referred to by the image decoding device 31 to decode a coding unit to be processed is prescribed. Specifically, the coding unit includes a prediction tree, a transform tree, and a CU header CUH. In the CU header, a prediction mode, a split method (PU split mode), and the like are prescribed.

In the prediction tree, prediction information (a reference picture index, a motion vector, and the like) of each prediction unit (PU) where the coding unit is split into one or multiple pieces is prescribed. In another expression, the prediction unit is one or multiple non-overlapping regions constituting the coding unit. The prediction tree includes one or multiple prediction units obtained by the above-mentioned split. Note that, in the following, units of prediction into which the prediction unit is further split is referred to as "subblocks". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks including two horizontal subblocks and two vertical subblocks.

The prediction processing may be performed for each of these prediction units (subblocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as that of the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. The PUs included in the CU are expressed as PU0, PU1, PU2, and PU3 sequentially.

Figure 3:
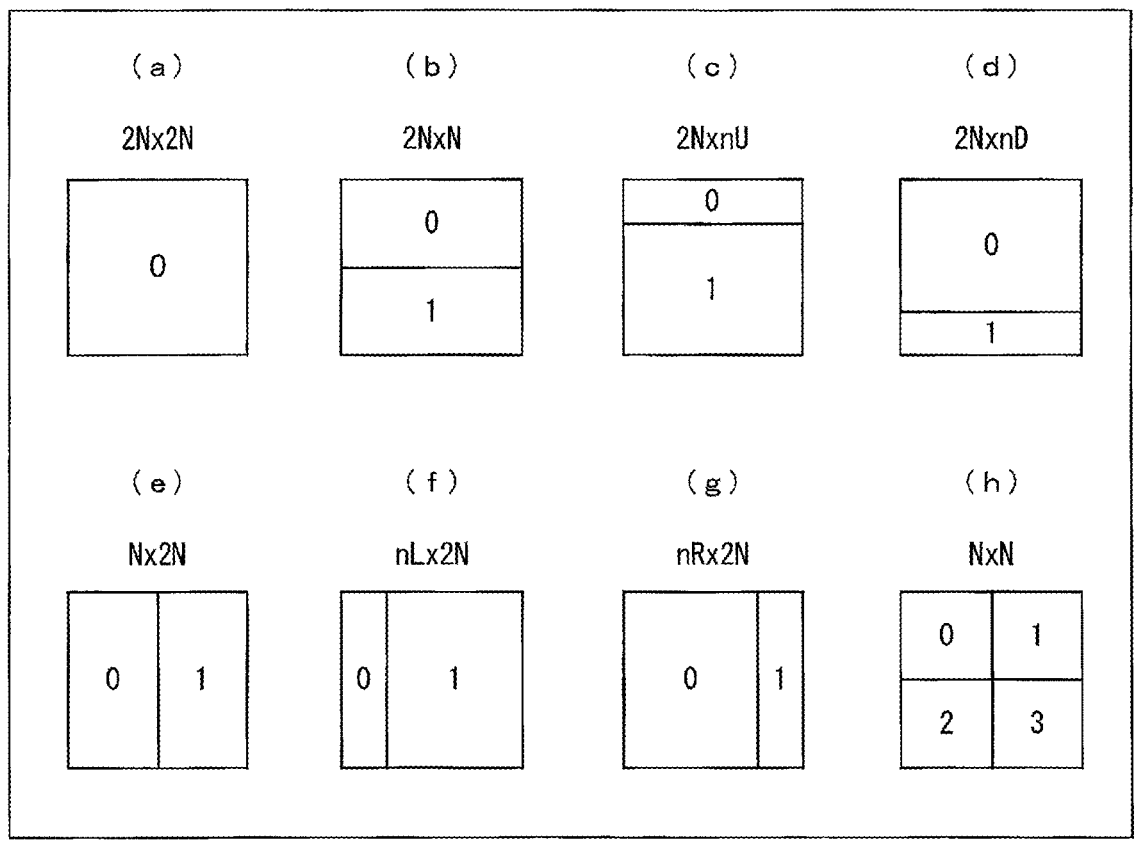
FIG. 3 is a diagram illustrating patterns of PU split modes. (a) to (h) of FIG. 3 illustrate partition shapes in cases that PU split modes are 2N×2N, 2N×N, 2N×nU, 2N×nD, N×2N, nL×2N, nR×2N, and N×N, respectively.

(a) to (h) of FIG. 3 illustrate shapes of partitions in respective PU split modes (positions of boundaries of PU splits) specifically. (a) of FIG. 3 indicates a partition of 2N×2N, and (b), (c), and (d) indicate partitions (horizontally long partitions) of 2N×N, 2N×nU, and 2N×nD, respectively. (e), (f), and (g) illustrate partitions (vertically long partitions) in cases of N×2N, nL×2N, and nR×2N, respectively, and (h) illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and a size of each transform unit are prescribed. In another expression, the transform unit refers to one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 4:
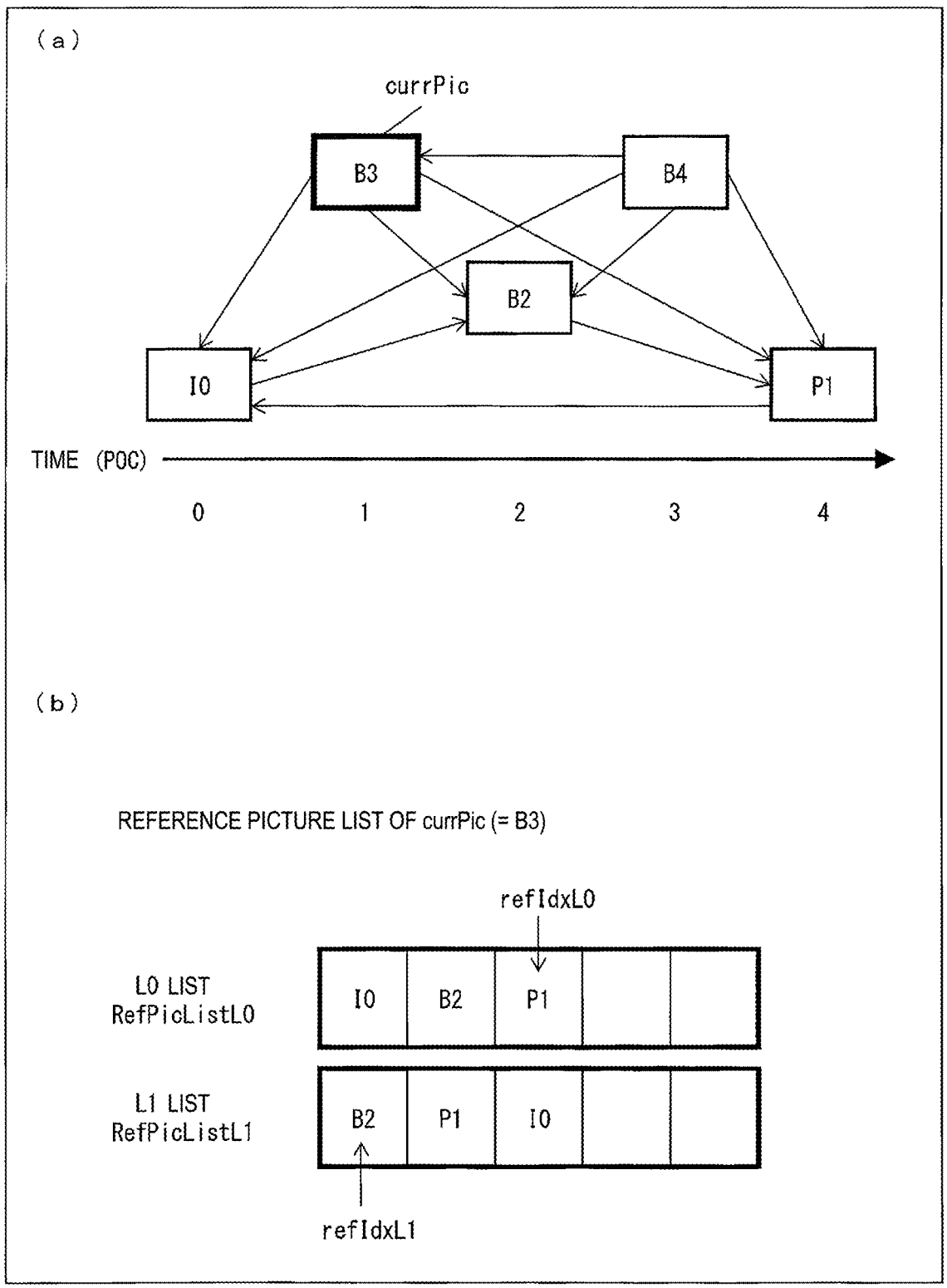
FIG. 4 is a conceptual diagram illustrating an example of reference pictures and reference picture lists.

A reference picture list is a list including reference pictures stored in a reference picture memory 306. FIG. 4 is a conceptual diagram illustrating an example of reference pictures and reference picture lists. In (a) of FIG. 4, a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. (b) of FIG. 4 indicates an example of reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge prediction mode is a mode to use and derive from prediction parameters of neighboring PUs already processed without including a prediction list utilization flag predFlagLX (or an inter prediction indicator inter_pred_idc), a reference picture index refIdxLX, and a motion vector mvLX in a coded data. The AMVP mode is a mode to include an inter prediction indicator inter_pred_idc, a reference picture index refIdxLX, a motion vector mvLX in a coded data. Note that, the motion vector mvLX is coded as a prediction vector index mvp_LX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate use of reference pictures managed in the reference picture list of the L0 list and the L1 list respectively, and indicate use of one reference picture (uni-prediction). PRED_BI indicates use of two reference pictures (bi-prediction BiPred), and uses reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX is referred to as a prediction vector mvpLX and a difference vector mvdLX respectively.

Inter Prediction Indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.

inter_pred_idc=(predFlagL1<<1)+predFlagL0
predFlagL0=inter_pred_idc & 1
predFlagL1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

biPred=(predFlagL0==1 && predFlagL1==1)

The flag biPred can be also derived from whether an inter prediction indicator is a value indicating to use two prediction lists (reference pictures). For example, the flag can be derived by the following equation.

biPred=(inter_pred_idc==PRED_BI)? 1:0

The equation can be also expressed with the following equation.

biPred=(inter_pred_idc==PRED_BI)

Note that, for example, PRED_BI can use the value of 3.

Configuration of Image Decoding Device

Figure 8:
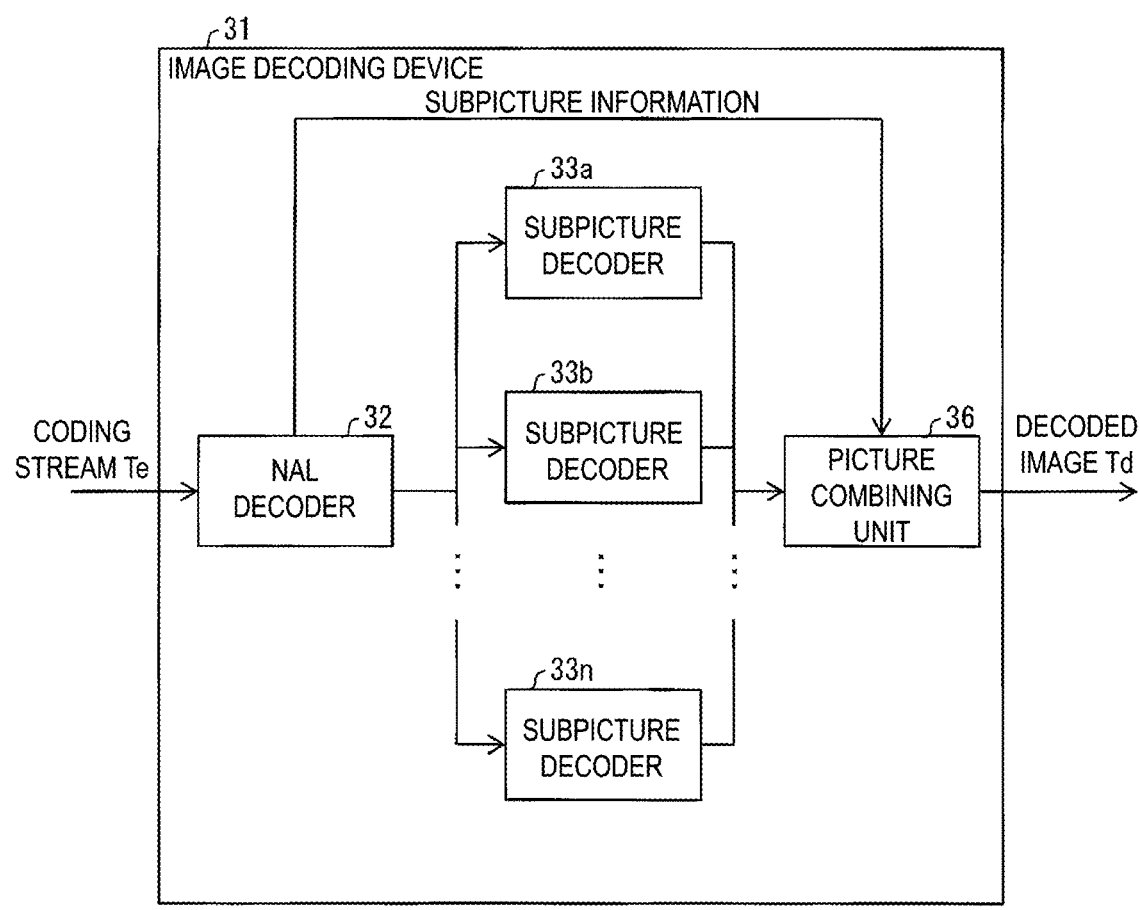
FIG. 8 is a block diagram illustrating a configuration of an image decoding device according to Embodiment 1.

A configuration of the image decoding device 31 according to the present embodiment will now be described. FIG. 8 is a block diagram illustrating a configuration of the image decoding device 31 according to the present embodiment. The image decoding device 31 includes a NAL decoder 32, a subpicture decoders 33a to 33n, and a picture combining unit 36.

The NAL decoder 32 decodes the coding stream Te input from the outside and coded in units of network abstraction layers (NALs). The NAL decoder 32 decodes the coding stream Te and transmits the resultant coding subpicture sequence to the subpicture decoders 33a to 33n. The NAL decoder 32 transmits the subpicture information and the like to the picture combining unit 36.

Note that the subpicture information is information indicating how the picture is divided, and includes the subpicture sequence parameter set SSPS, and the like.

The subpicture decoders 33a to 33n decode the respective subpictures, and transmits the decoded subpictures to the picture combining unit 36.

Here, the subpicture decoders 33a to 33n perform decoding processing on the subpicture sequence as one independent video sequence, and thus do not refer to inter-subpicture-sequence prediction information temporally or spatially in a case of performing the decoding processing. That is, in a case of decoding a subpicture in one picture, each of the subpicture decoders 33a to 33n does not refer to a subpicture in another subpicture sequence.

In this manner, since each of the subpicture decoders 33a to 33n decodes the subpicture, decoding processing can be performed on multiple subpictures in parallel, and independent decoding of only one subpicture can be performed. As a result, the decoding processing can be performed efficiently by the subpicture decoders 33a to 33n.

The picture combining unit 36 refers to the subpicture information transmitted from the NAL decoder 32 and the subpictures decoded by the subpicture decoders 33a to 33n, and generates and outputs a decoded image Td. Here, the picture combining unit 36 can generate and output the decoded image Td by compositing the decoded multiple subpictures into a picture with overlapping of the subpictures allowed.

Note that in a case of composing subpictures, the picture combining unit 36 may generate and output the subpictures so that a gap is formed between the composed subpictures.

The picture combining unit 36 composes the subpicture as described above, and hence the image decoding device 31 can prevent a break of the decoding processing at the boundary of the subpictures and a difference in image quality at the boundary of the subpictures. As a result, high-quality images can be obtained.

Configuration of Subpicture Decoder

Figure 9:
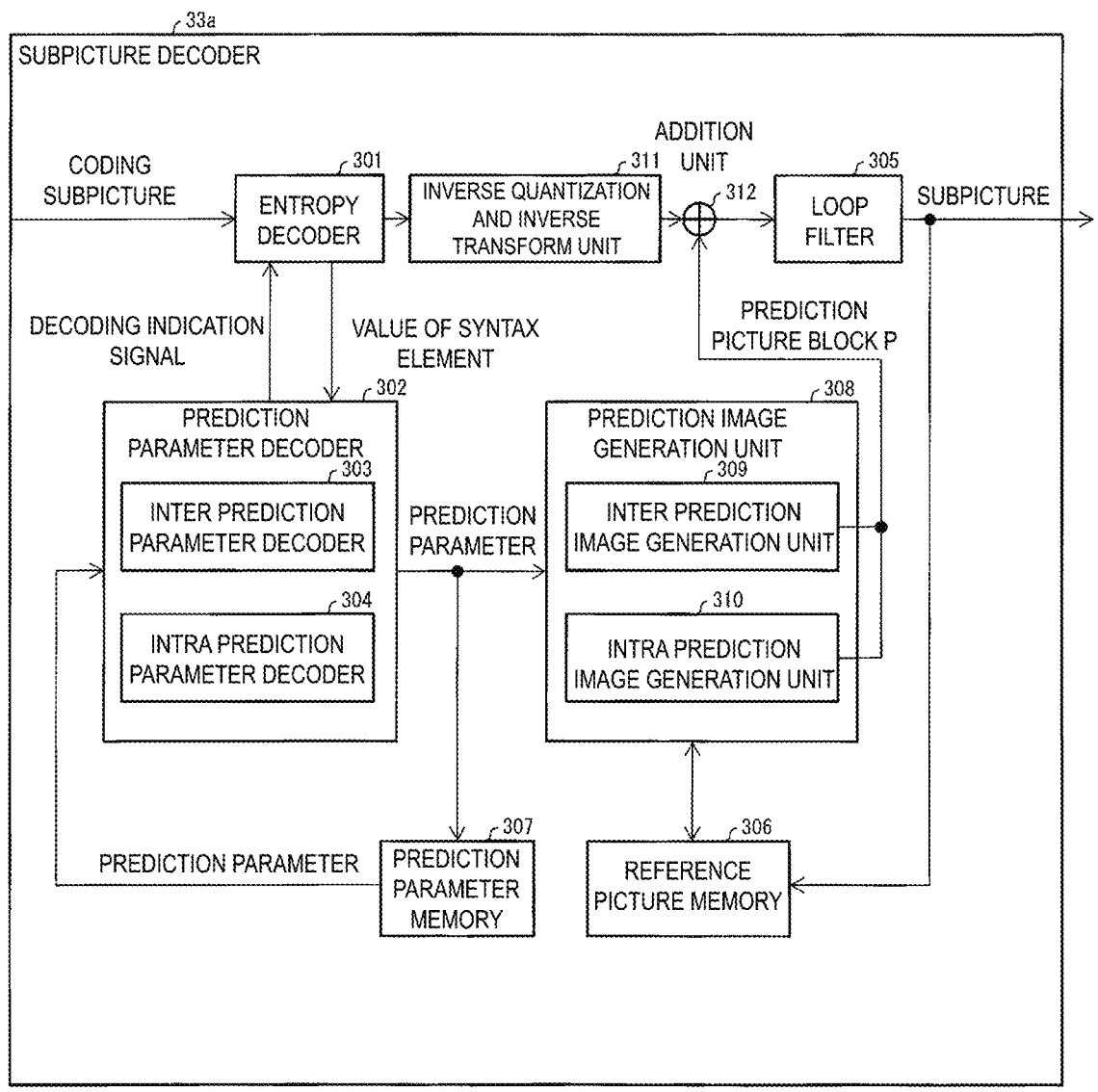
FIG. 9 is a block diagram illustrating a configuration of a subpicture decoder on the image decoding device according to Embodiment 1.

A configuration of each of the subpicture decoders 33a to 33n will be described. As an example below, the configuration of the subpicture decoders 33a will be described using FIG. 9. FIG. 9 is a block diagram illustrating a configuration of the subpicture decoder 33a.

The subpicture decoder 33a includes an entropy decoder 301, a prediction parameter decoder 302, a loop filter 305, a reference picture memory 306, a prediction parameter memory 307, a prediction image generation unit 308, an inverse quantization and inverse transform unit 311, and an addition unit 312.

The prediction parameter decoder 302 includes an inter prediction parameter decoder 303 and an intra prediction parameter decoder 304. The prediction image generation unit 308 includes an inter prediction image generation unit 309 and an intra prediction image generation unit 310.

The entropy decoder 301 performs entropy decoding on the coding subpictures, and separates and decodes individual codes (syntax elements). The separated codes include prediction information used to generate a prediction image and residual information used to generate a difference image and the like.

The entropy decoder 301 outputs a part of the separated codes to the prediction parameter decoder 302. For example, a part of the separated codes includes a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. The control of which code to decode is performed based on an indication of the prediction parameter decoder 302. The entropy decoder 301 outputs quantization coefficients to the inverse quantization and inverse transform unit 311. These quantization coefficients are coefficients obtained by performing, in coding processing, frequency transforms such as Discrete Cosine Transform (DCT), Discrete Sine Transform (DST), and Karyhnen Loeve Transform (KLT) on the residual signal for quantization.

The inter prediction parameter decoder 303 decodes an inter prediction parameter with reference to a prediction parameter stored in the prediction parameter memory 307, based on a code input from the entropy decoder 301.

The inter prediction parameter decoder 303 outputs a decoded inter prediction parameter to the prediction image generation unit 308, and also stores the decoded inter prediction parameter in the prediction parameter memory 307.

The intra prediction parameter decoder 304 decodes an intra prediction parameter with reference to a prediction parameter stored in the prediction parameter memory 307, based on a code input from the entropy decoder 301. The intra prediction parameter is a parameter used in processing of predicting a CU in one picture, for example, an intra prediction mode IntraPredMode. The intra prediction parameter decoder 304 outputs a decoded intra prediction parameter to the prediction image generation unit 308, and also stores the decoded intra prediction parameter in the prediction parameter memory 307.

The intra prediction parameter decoder 304 may derive different intra prediction modes depending on luminance and chrominance. In this case, the intra prediction parameter decoder 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of a planar prediction (0), a DC prediction (1), directional predictions (2 to 34), and an LM mode (35). The intra prediction parameter decoder 304 decodes a flag indicating whether or not the IntraPredModeC is the same mode as the luminance mode. The intra prediction parameter decoder 304 assigns IntraPredModeY to IntraPredModeC in a case that the flag indicates that the IntraPredModeC is the same mode as the luminance mode. The intra prediction parameter decoder 304 may decode a planar prediction (0), a DC prediction (1), directional predictions (2 to 34), and an LM mode (35) as IntraPredModeC in a case that the flag indicates that the IntraPredModeC is a mode different from the luminance mode.

The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the addition unit 312 in a prescribed position for each subpicture and CU to be decoded.

The prediction parameter memory 307 stores a prediction parameter in a prescribed position for each picture and prediction unit (or a subblock, a fixed size block, and a pixel) to be decoded. Specifically, the prediction parameter memory 307 stores the inter prediction parameter decoded by the inter prediction parameter decoder 303. The prediction parameter memory 307 stores an intra prediction parameter decoded by the intra prediction parameter decoder 304 and a prediction mode predMode separated by the entropy decoder 301. For example, inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoder 301 is input, and a prediction parameter is input from the prediction parameter decoder 302. The prediction image generation unit 308 reads a reference picture from the reference picture memory 306. The prediction image generation unit 308 generates a prediction image of the PU or subblock by using the input prediction parameter and the read reference picture (reference picture block), based on a prediction mode indicated by the prediction mode predMode.

Here, in a case that the prediction mode predMode indicates an inter prediction mode, the inter prediction image generation unit 309 generates a prediction image of the PU or subblock by an inter prediction by using the inter prediction parameter input from the inter prediction parameter decoder 303 and the read reference picture (reference picture block).

For a reference picture list (an L0 list or an L1 list) where a prediction list utilization flag predFlagLX is 1, the inter prediction image generation unit 309 reads, from the reference picture memory 306, a reference picture block at a position indicated by a motion vector mvLX, based on a decoding target PU, with respect to a reference picture indicated as the reference picture index refIdxLX. The inter prediction image generation unit 309 performs a prediction based on a read reference picture block and generates a prediction image of the PU. The inter prediction image generation unit 309 outputs the generated prediction image of the PU to the addition unit 312. Here, the reference picture block refers to a set of pixels (referred to as blocks because the pixels are normally rectangular) on the reference picture, and is a region that is referenced to generate the prediction image of the PU or the subblock.

In a case that the prediction mode predMode indicates an intra prediction mode, the intra prediction image generation unit 310 performs an intra prediction by using an intra prediction parameter input from the intra prediction parameter decoder 304 and a read reference picture. Specifically, the intra prediction image generation unit 310 reads, from the reference picture memory 306, an adjacent PU, which is a picture to be decoded, in a prescribed range from a PU to be decoded which is included in the already decoded PUs. The prescribed range is, for example, any of adjacent PUs in left, top left, top, and top right in a case that the PU to be decoded moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs a prediction in a prediction mode indicated by the intra prediction mode IntraPredMode, based on a read adjacent PU, and generates a prediction image of the PU. The intra prediction image generation unit 310 outputs the generated prediction image of the PU to the addition unit 312.

In a case that the intra prediction parameter decoder 304 derives different intra prediction modes depending on luminance and chrominance, the intra prediction image generation unit 310 generates a prediction image of a PU of luminance by any of a planar prediction (0), a DC prediction (1), and directional predictions (2 to 34) depending on a luminance prediction mode IntraPredModeY. The intra prediction image generation unit 310 generates a prediction image of a PU of chrominance by any of a planar prediction (0), a DC prediction (1), directional predictions (2 to 34), and an LM mode (35) depending on a chrominance prediction mode IntraPredModeC.

The inverse quantization and inverse transform unit 311 performs inverse quantization on quantization coefficients input from the entropy decoder 301 to calculate transform coefficients. The inverse quantization and inverse transform unit 311 performs inverse frequency transforms such as inverse DCT, inverse DST, and inverse KLT on the calculated transform coefficients to calculate residual signals. The inverse quantization and inverse transform unit 311 outputs the calculated residual signals to the addition unit 312.

The addition unit 312 adds, for each pixel, the prediction images of the PUs input from the inter prediction image generation unit 309 or the intra prediction image generation unit 310 and the residual signals input from the inverse quantization and inverse transform unit 311, to generate a decoded image of the PU. The addition unit 312 stores the generated decoded image of the PU in the reference picture memory 306, and outputs a decoded image Td where the generated decoded image of the PU is integrated for each picture to the outside.

Example of Image Generation by Picture Combining Unit 36

An example of image generation by the picture combining unit 36 will be described in detail below using FIGS. 10 to 12.

FIG. 10 is a diagram illustrating an example of syntax included in each of the sequence parameter set SPS, the subpicture sequence parameter set SSPS, and the picture parameter set PS. FIG. 11 is a diagram of a table illustrating values of SubWidthC and SubHeightC derived from chroma_format_idc. FIG. 12 is a diagram illustrating a correspondence relationship between an example of the syntax included in the subpicture sequence parameter set SSPS and portions in the picture.

The picture combining unit 36 may compose multiple subpictures with overlapping of the subpictures allowed by referring to the syntax included in the subpicture sequence parameter set SSPS as illustrated in FIG. 10.

In a case that a gap is formed between the subpictures, i.e., in a case that the pixels in the picture are not included in all of the subpictures, the picture combining unit 36 may fill the gap with a prescribed pixel value. The picture combining unit 36 may use, for overlapping pixels, the weighted average value of pixel values at the same pixel position among the subpictures. In a case that three or more pixels overlap, the picture combining unit 36 may compose the subpictures using a value selected from multiple values using a median value or a middle value.

As described above, the picture combining unit 36 can efficiently decode the subpictures in parallel and independently in units of subpicture sequences. This allows prevention of a break of coding or decoding processing at the boundary of the subpicture, varying the image quality at the boundary of the subpicture. As a result, high-quality images can be obtained.

Now, the syntax included in the subpicture sequence parameter set SSPS will be described with reference to FIGS. 10 to 12.

pic_width_in_luma_samples and pic_height_in_luma_samples in FIG. 10 respectively indicate the picture width and height in luminance samples. conformance_window_flag is a flag indicating whether conf_win_left_offset, conf_win_right_offset, conf_win_top_offset, and conf_win_bottom_offset defining an output range (conformance window) of the picture appear in the coded data. In a case that the flag is 0, these values do not appear in the coded data, and conf_win_left_offset, conf_win_right_offset, conf_win_top_offset, and conf_win_bottom_offset are each derived as 0.

Conf_win_left_offset, conf_win_right_offset, conf_win_top_offset, conf_win_bottom_offset respectively indicate an offset from the left end of the decoded picture to the left end of the conformance window, an offset from the right end of the decoded picture to the right end of the conformance window, an offset from the top end of the decoded picture to the top end of the conformance window, and an offset from the bottom end of the decoded picture to the bottom end of the conformance window. In a case that all of these values are 0, the size of the conformance window is the same in size as the decoded picture. That is, the entire decoded picture is output. In a case that any value is greater than 0, a portion of the decoded picture is output as a conformance window.

pic_width_in_luma_samples and pic_height_in_luma_samples, which indicate the size of the decoded picture, are preferably integral multiples of 8, 16, 32, or the like or integral multiples of MinCbSizeY, which is the minimum CTU size, for efficiency of processing. However, in a case that the picture combining unit 36 uses the conformance window, pic_width_in_luma_samples and pic_height_in_luma_samples, which indicate the size of the decoded picture, need not be integral multiples of 8, 16, 32, or the like. In this way, in a case that the picture combining unit 36 uses the conformance window, the video can be decoded even in a case that the actual size (output size) of the picture is not an integer multiple of any of these values.

sub_pic_left_position in FIG. 10 is information describing the position of the pixel at the left end of the subpicture, and sub_pic_top_position is information describing the position of the pixel at the top end of the subpicture.

Figure 12:
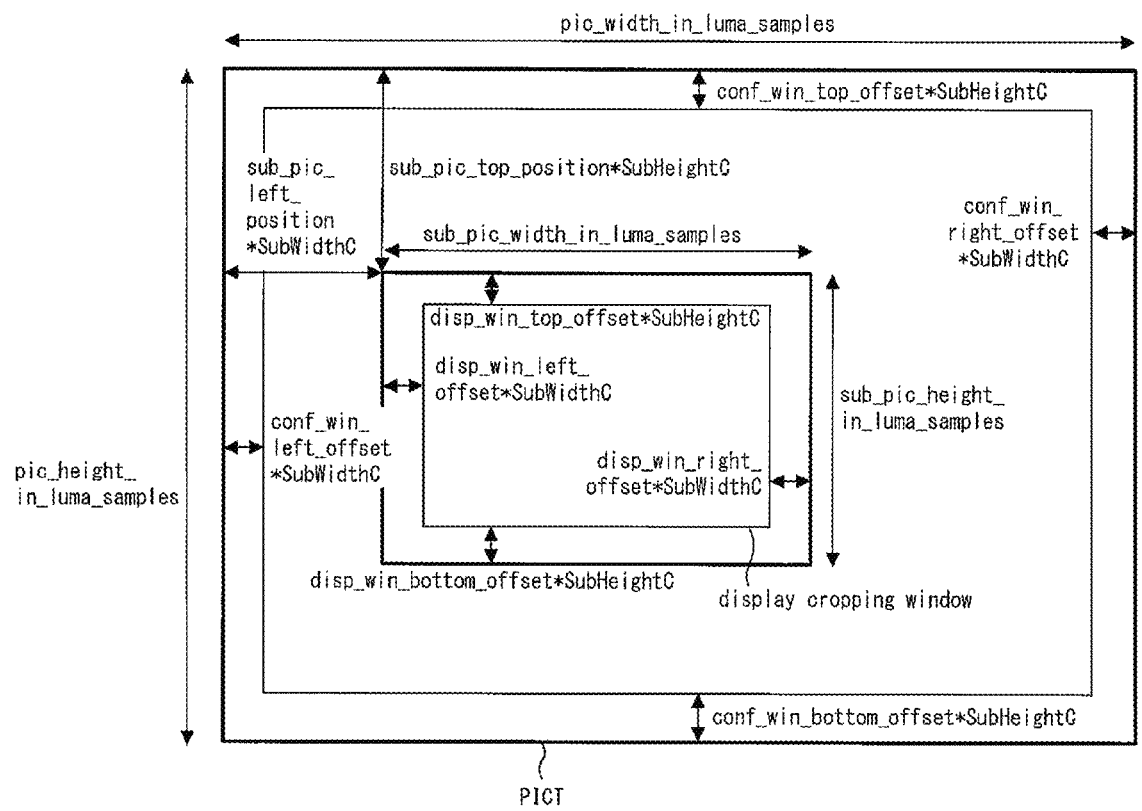
FIG. 12 is a diagram illustrating a correspondence relationship between an example of the syntax included in the subpicture sequence parameter set SSPS and portions in the picture.

As illustrated in FIG. 12, sub_pic_left_position*SubWidthC indicates the position of the luminance pixel at the left end of the subpicture. The sub_pic_top_position*SubHightC indicates the position of the luminance pixel at the top end of the subpicture.

Note that the values of SubWidthC and SubHightC are derived from chroma_format_idc illustrated in FIG. 11. Each of the values in Chroma format in FIG. 11 indicates a value dependent on a sample structure in a horizontal direction and a vertical direction of a chrominance pixel.

The picture combining unit 36 refers to the syntax indicating the position of each subpicture, such as sub_pic_left_position and sub_pic_top_position described above, and composes multiple subpictures. Accordingly, the positions of the subpictures to be composed can be identified.

sub_pic_width_in_luma_samples in FIG. 10 indicates the subpicture width in luminance samples, as illustrated in FIG. 12. sub_pic_width_in_luma_samples is not 0 and needs to be an integral multiple of MinCbSizeY, which is the minimum CTU size.

sub_pic_height_in_luma_samples in FIG. 10 indicates the subpicture height in luminance samples, as illustrated in FIG. 12. sub_pic_height_in_luma_samples is not 0 and needs to be an integral multiple of MinCbSizeY.

The picture combining unit 36 refers to the syntax indicating the size of each subpicture, such as sub_pic_width_in_luma_samples and sub_pic_height_in_luma_samples described above, and composes multiple subpictures. Accordingly, the sizes of the subpictures to be composed can be identified.

Display Area disp_win_flag in FIG. 10 indicates whether there is any display cropping window offset parameters, which is a parameter for displaying pixels in a subpicture. The value of disp_win_flag being 1 means presence of display cropping window offset parameters. Examples of the display cropping window offset parameters include disp_win_left_offset, disp_win_right_offset, disp_win_top_offset, and disp_win_bottom_offset. In a case that the value of disp_win_flag is 0, the values of disp_win_left_offset, disp_win_right_offset, disp_win_top_offset, and disp_win_bottom_offset is assumed to be 0. In other words, the value of disp_win_flag being 0 means absence of display cropping window offset parameters.

disp_win_left_offset in FIG. 10 indicates an offset from the left end of the subpicture. disp_win_right_offset in FIG. 10 indicates an offset from the right end of the subpicture. disp_win_top_offset in FIG. 10 indicates an offset from the top end of the subpicture. disp_win_bottom_offset in FIG. 10 indicates an offset from the bottom end of the subpicture.

Thus, disp_win_left_offset, disp_win_right_offset, disp_win_top_offset, and disp_win_bottom_offset indicate an actually displayed rectangular region of the subpicture, as illustrated in FIG. 12.

As illustrated in FIG. 12, the region of the display cropping window in the horizontal direction extends from disp_win_left_offset*SubWidthC to sub_pic_width_in_luma_samples−(disp_win_right_offset*SubWidthC+1). The region of the display cropping window extends from disp_win_top_offset*SubHeightC in the vertical direction to sub_pic_height_in_luma_samples−(disp_win_bottom_offset*SubHeightC+1).

Note that in the display cropping window, in a case that multiple subpictures overlap, the picture combining unit 36 may calculate the average value of the pixel values of the multiple subpictures in the overlapping portion as the pixel value of the overlapping portion. The picture combining unit 36 may use a weighted average value corresponding to quantization parameters, as the pixel value of the overlapping portion between the multiple subpictures. The picture combining unit 36 may perform filtering processing on the overlapping portion between the multiple subpictures. Thus, coding distortion can be removed from the overlapping portions between the multiple subpictures.

As illustrated in FIG. 12, the value of (disp_win_left_offset+disp_win_right_offset)*SubWidthC needs to be smaller than the value of sub_pic_width_in_luma_samples. The value of (disp_win_top_offset+disp_win_bottom_offset)*SubHeightC needs to be smaller than the value of sub_pic_height_in_luma_samples.

The picture combining unit 36 refers to the syntax indicating the offset of each subpicture, such as disp_win_left_offset, disp_win_right_offset, disp_win_top_offset, and disp_win_bottom_offset described above, and composes multiple subpictures. This allows identification of the offsets of the subpictures to be composed.

The picture combining unit 36 may use the conformance window for subpictures (disp_win_left_offset, disp_win_right_offset, disp_win_top_offset, and disp_win_bottom_offset). This allows the width and height of the subpicture to be set to sizes preferable for processing, e.g., minimum integral multiples of MinCbSizeY, while allowing the actual output size (substantial size of the subpicture) to be freely configured. That is, tile arrangement can be achieved at a high degree of freedom. For example, in a case that the subpictures are operated in parallel decoders, this configuration is effective for load balancing in which an equal load is imposed on the decoders in connection with the processing capability. In a 360-degree video such as in a cube format, the screen may be separated into faces, and efficient coding can be achieved by aligning tiles (subpictures) with the faces. The 360-degree video may also involve different tile (subpicture) sizes in order to allow only a part of the video to be clipped out. In this case, the subblock size can be freely configured.

For example, it is assumed that, in a case that a 1920×1080 image is separated into subpictures with a size of 4×4 or the like for decoding, no conformance window is present for the subpictures. In this case, to set the size of the subpicture such that MinCbSizeY is an integral multiple of 8, the picture combining unit 36 needs to decode the subpictures in the following subblock sizes in raster scan order from the top left.

480×272, 480×272, 480×272, 480×272, 480×272, 480×272, 480×272, 480×272, 480×272, 480×272, 480×272, 480×264, 480×264, 480×264, and 480×264, On the other hand, the picture combining unit 36 may decode the subpictures with, for example, a subpicture decoding size set to 480×272 and a subpicture output size set to 480×270. Thus, the image can be separated into subpictures all having the same size as follows.

480×270, 480×270, 480×270, 480×270, 480×270, 480×270, 480×270, 480×270, 480×270, 480×270, 480×270, 480×270, 480×270, 480×270, and 480×270, In this case, the values of disp_win_left_offse, disp_win_right_offset, disp_win_top_offset can be set to 0 and the value of disp_win_bottom_offset can be assumed to be 2.

In a case of splitting a 1920×1080 360-degree video into faces with a size of 3×2 and setting a subblock for each face, the picture combining unit 36 may set the decoding size of each subblock to 640×544 and set the output size of each subblock to 640×540. This allows the size of the subblock to be perfectly matched with the size of the face. In this case, the values of disp_win_left_offse, disp_win_right_offset, disp_win_top_offset can be set to 0, and the value of disp_win_bottom_offset value can be assumed to be 4.

In a case that each of the subpictures is independently coded and decoded, a reference image located beyond the subpicture fails to be utilized, and thus the boundary portion of the decoded image of each subpicture may have reduced image quality. Here, the picture combining unit 36 may use the conformance window (disp_win_left_offset, disp_win_right_offset, disp_win_top_offset, and disp_win_bottom_offset) to avoid the use of areas with low image quality. This allows prevention of a reduction in image quality.

As described above, the picture combining unit 36 may output a portion of the generated decoded image as a conformance window in units of pictures. In other words, the picture combining unit 36 may generate a decoded image and output an output image by decoding coded data including the syntax of a conformance window in units of subpictures (disp_win_left_offset, disp_win_right_offset, disp_win_top_offset, and disp_win_bottom_offset) and the syntax of a conformance window in units of pictures (conf_win_left_offset, conf_win_right_offset, conf_win_top_offset, conf_win_bottom_offset). This allows the size of each of the subpictures to be freely configured regardless of the unit of processing (for example, MinCbSizeY), while allowing the size of the picture to be freely configured regardless of the unit of processing.

Modified Example of Composition by Picture Combining Unit 36

The syntax referred to by the picture combining unit 36 is not limited to the example described above. The picture combining unit 36 may be configured to refer to the syntax included in the sequence parameter set SPS.

The syntax included in SPS in the present modified example will be described below using FIGS. 13 and 14.

FIG. 13 is a diagram illustrating another example of the syntax included in sequence parameter set SPS. FIG. 14 is a diagram illustrating a correspondence relationship between another example of the syntax and portions in the picture.

Here, sub_picture_enable_flag in FIG. 13 is a flag indicating whether any subpicture is available, i.e., any subpicture is present in the picture. The value of sub_picture_enable_flag being 1 means that a subpicture is present in the picture. The value of sub_picture_enable_flag being 0 means that no subpicture is present.

The value of num_sub_picture_hor_minus1 in FIG. 13 plus 1 indicates the number of subpictures in the horizontal direction. The value of num_sub_picture_var_minus1 plus 1 indicates the number of subpictures in the vertical direction.

uniform_spacing_flag is a flag indicating whether the value of each piece of the syntax is explicitly indicated. In a case that the value of the flag is 0, the value of each piece of the syntax is explicitly indicated. In a case that the value of the flag is 1, the value of each piece of the syntax are implicitly calculated by a method described below.

sub_pic_width_in_luma_samples [i] indicates the subpicture width in luminance samples. It is assumed that the value of sub_pic_width_in_luma_samples [i] is not 0 and is a minimum integral multiple of MinCbSizeY exceeding pic_width_in_luma_samples/(num_sub_picture_hor_minus1+1).

sub_pic_height_in_luma_samples [i] indicates the subpicture height in luminance samples. It is assumed that the value of sub_pic_height_in_luma_samples [i] is not 0 and is a minimum integral multiple of MinCbSizeY exceeding pic_height_in_luma_samples/(num_sub_picture_var_minus1+1).

sub_pic_left_position [i] is information describing the position of the pixel at the left end of the subpicture, and sub_pic_top_position [i] is information describing the position of the pixel at the top end of the subpicture. With the sample position of the chrominance signal taken into account, sub_pic_left_position [i]*SubWidthC indicates the position of the luminance pixel at the left end of the subpicture. sub_pic_top_position [i]*SubHightC indicates the position of the luminance pixel at the top end of the subpicture.

sub_pic_left_position [i] is assumed to be a minimum integer equal to or greater than i*(pic_width_in_luma_samples/((num_sub_picture_hor_minus1+1)*SubWidthC)). sub_pic_top_position [i] is assumed to be a minimum integer equal to or greater than i*(pic_height_in_luma_samples/((num_sub_picture_var_minus1+1)*SubHeightC)).

disp_win_hor_flag (i) and disp_win_ver_flag (i) described below are assumed to be 0.

Note that sub_pic_left_position [i] may be a value that is equal to or greater than 0 and that is obtained by subtracting a specific value equal to or greater than 0 and equal to or smaller than MinCbSizeY/SubWidthC−1 from a minimum integer equal to or greater than i*(pic_width_in_luma_samples/((num_sub_picture_hor_minus1+1)*SubWidthC)). Similarly, sub_pic_left_position [i] may also be a value obtained by subtracting a value equal to or greater than 0 and equal to or smaller than MinCbSizeY/SubHeightC−1 from a minimum integer equal to or greater than i*(pic_height_in_luma_samples/((num_sub_picture_var_minus1+1)*SubHeightC)).

Figure 14:
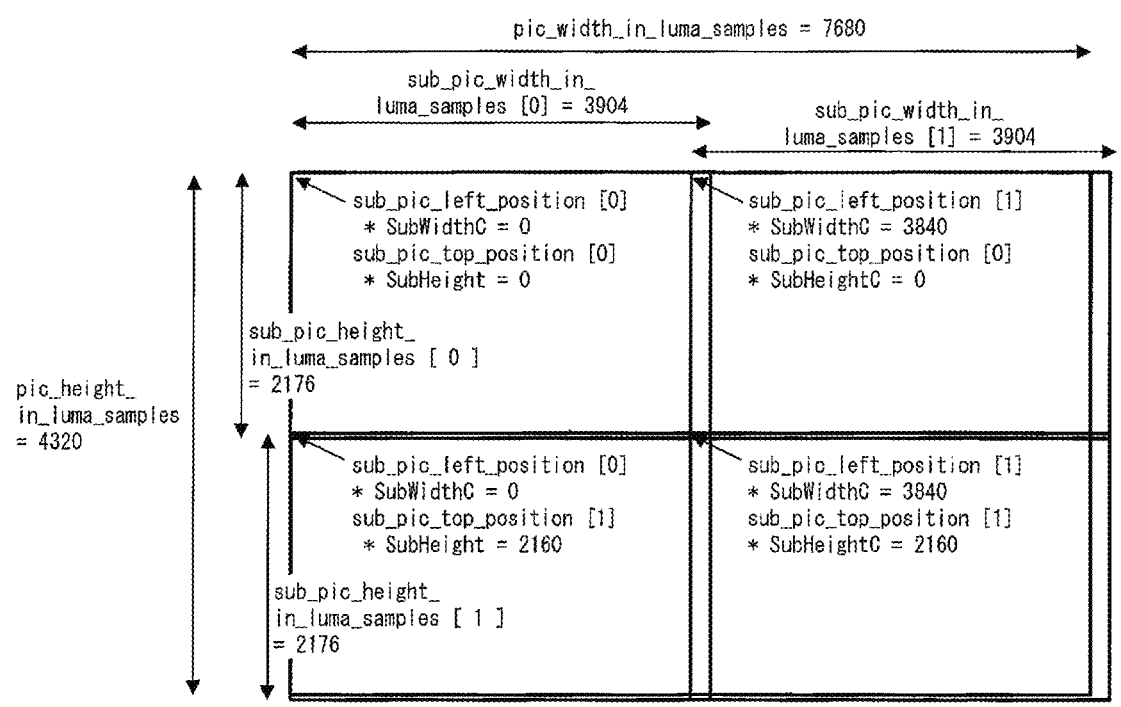
FIG. 14 is a diagram illustrating a correspondence relationship between another example of the syntax included in the sequence parameter set SPS and portions in a picture.

Note that, as illustrated in FIG. 14, i in sub_pic_width_in_luma_samples [i] is a number indicating each of the subpictures in the horizontal direction. The subpicture sequence parameter set SSPS (FIG. 10) in Embodiment 1 is assigned in units of subpicture sequences. On the other hand, the target sequence of the sequence parameter set SPS includes multiple subpicture sequences, and thus, in the present modified example, the syntax related to each of the subpictures has an array structure.

In Case that Value of Uniform_Spacing_Flag is 1

A method for calculating each piece of the syntax in a case that the value of uniform_spacing_flag is 1 will be described using examples.

For example, as illustrated in FIG. 14, a case will be described in which an 8K×4K picture with a pic_width_in_luma_samples value of 7680 and a pic_height_in_luma_samples value of 4320 is split into two vertical sections and two horizontal sections. It is also assumed that sub_picture_enable_flag is 1 and that MinCbSizeY is 64.

In this case, as illustrated in FIG. 14, num_sub_picture_hor_minus1 is 1 and num_sub_picture_ver_minus1 is 1.

sub_pic_width_in_luma_samples [0] and sub_pic_width_in_luma_samples [1] are each 3904, which is a minimum integral multiple of 64 (61 times) exceeding 7680/2=3840. sub_pic_height_in_luma_samples [0] and sub_pic_height_in_luma_samples [1] are each 2176, which is a minimum integral multiple of 64 (34 times) exceeding 4320/2=2160.

In the subpicture in the bottom right of FIG. 14, sub_pic_left_position [1]*SubWidthC is 1*7680/2*1=3840. sub_pic_top_position [1]*SubWidthC is 1*4320/2*1=2160.

In Case that Value of Uniform_Spacing_Flag is 0

In a case that uniform_spacing_flag is 0, the values of sub_pic_width_in_luma_samples [i], sub_pic_height_in_luma_samples [i], sub_pic_left_position [i], sub_pic_top_position [i], and the like described above are expressly defined. For example, in a case that uniform_spacing_flag is 0, a specific value is configured for sub_pic_width_in_luma_samples [i], that is, sub_pic_width_in_luma_samples [0]=3904.

Display Area disp_win_hor_flag [i] and disp_win_ver_flag [i] in FIG. 13 respectively indicate whether display window offset parameters are present that indicate horizontal and vertical pixels in the subpicture. Examples of the display window offset parameters include disp_win_left_offset [i], disp_win_right_offset [i], disp_win_top_offset, and disp_win_bottom_offset [i].

In a case that the value of disp_win_hor_flag [i] is 1, disp_win_left_offset [i] and disp_win_right_offset [i] are present. In a case that the value of disp_win_hor_flag [i] is 0, the values for disp_win_top_offset [i] and disp_win_bottom_offset [i] are 0. In other words, the value of disp_win_hor_flag [i] being 0 means that no display window offset parameters with respect to the horizontal direction is not present.

In a case that the value of disp_win_ver_flag [i] is 1, disp_win_top_offset [i] and disp_win_bottom_offset [i] are present. In a case that the value of disp_win_ver_flag [i] is 0, the values of disp_win_top_offset [i] and disp_win_bottom_offset [i] are 0. In other words, the value of disp_win_ver_flag [i] being 0 means that no display window offset parameters with respect to the vertical direction are present.

disp_win_left_offset [i], disp_win_right_offset [i], disp_win_top_offset [i] and disp_win_bottom_offset [i] define a rectangular region displaying the subpicture.

The region of a display cropping window in the horizontal direction is a region extending from sub_pic_left_position [i]*SubWidthC+disp_win_left_offset [i]*SubWidthC to sub_pic_left_position [i]*SubWidthC+sub_pic_width_in_luma_samples [i]−(disp_win_right_offset [i]*SubWidthC+1). The region of the display cropping window in the vertical direction extends from sub_pic_top_position [i]*SubHeightC+disp_win_top_offset [i]*SubHeightC to sub_pic_top_position [i]*SubHeightC+sub_pic_height_in_luma_samples [i]−(disp_win_bottom_offset [i]*SubHeightC+1).

The value of (disp_win_left_offset [i]+disp_win_right_offset [i])*SubWidthC needs to be smaller than the value of pic_width_in_luma_samples [i]. The value of (disp_win_top_offset [i]+disp_win_bottom_offset [i])*SubHeightC needs to be smaller than the value of sub_pic_height_in_luma_samples [i].

Note that, as illustrated in FIG. 14, a portion of the subpicture can be allocated outside of the picture. In this case, the picture combining unit 36 refers to the value of padding in the picture for the region allocated outside the picture.

The same size of the subpictures allows the decoding processing to be efficiently performed even in a configuration in which a portion of the subpicture is allocated outside the picture.

Configuration of Image Encoding Device

Figure 5:
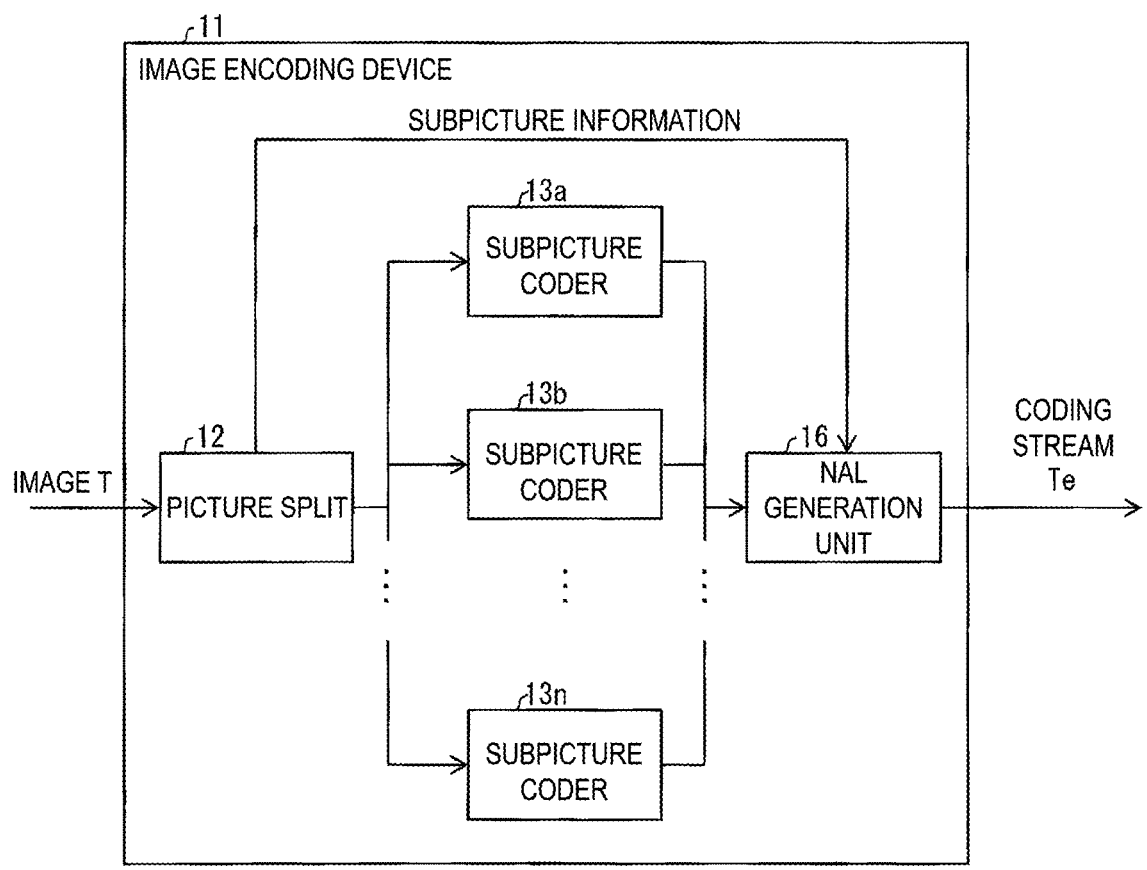
FIG. 5 is a block diagram illustrating a configuration of an image encoding device according to Embodiment 1.

A configuration of the image encoding device 11 according to the present embodiment will now be described. FIG. 5 is a block diagram illustrating the configuration of the image encoding device 11 according to the present embodiment. The image encoding device 11 includes a picture split unit 12, subpicture coders 13a to 13n, and a NAL generation unit 16.

The picture split unit 12 divides each of images T (picture) into multiple subpictures configured in each image T and allowed to overlap with one another, and transmits the subpictures to the subpicture coders 13a to 13n.

The picture split unit 12 generates subpicture information, and transmits the subpicture information to the NAL generation unit 16.

The subpicture coder 13a to 13n code the respective subpictures. The subpicture coder 13a to 13n code the subpictures in units of subpicture sequences. In this way, the subpicture coders 13a to 13n can efficiently perform coding processing on the subpictures in parallel.

Here, the subpicture coders 13a to 13n perform coding processing as one independent video sequence, and inter-subpicture-sequence prediction information is not referred to temporally nor spatially in a case that the coding processing is performed. In other words, in a case of coding a subpicture in one picture, each of the subpicture coders 13a to 13n does not refer to another subpicture.

The NAL generation unit 16 uses the subpicture information transmitted from the picture split unit 12 and the subpictures coded by the subpicture coders 13a to 13n to generate a coding stream Te in NAL units.

Thus, according to the image encoding device 11, since the picture is divided into multiple subpictures allowed to overlap with one another, the image quality at the end of each of the subpictures can be prevented from varying due to a failure to obtain an accurate motion vector. In a case that the image decoding device composes the subpictures, the image encoding device 11 can prevent the image quality from varying at the boundary of the subpictures. As a result, the image encoding device 11 can obtain high-quality images.

Configuration of Subpicture Coder

Figure 6:
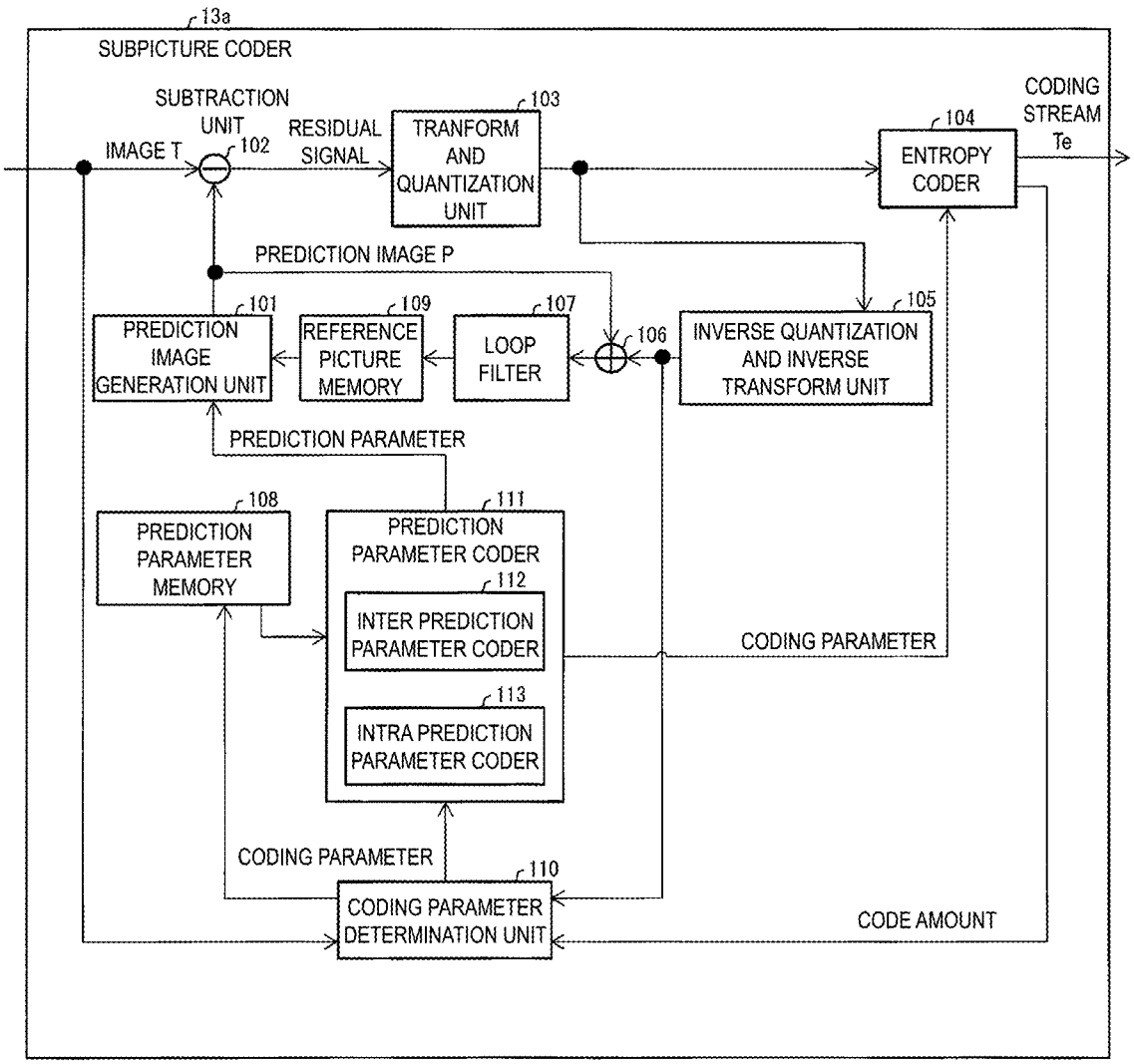
FIG. 6 is a block diagram illustrating a configuration of a subpicture coder in the image encoding device according to Embodiment 1.

Now, a configuration of each of the subpicture coders 13a to 13n will be described. As an example, the configuration of the subpicture coder 13a will be described below using FIG. 6. FIG. 6 is a block diagram illustrating the configuration of the subpicture coder 13a.

The subpicture coder 13a includes a prediction image generation unit 101, a subtraction unit 102, a transform and quantization unit 103, an entropy coder 104, an inverse quantization and inverse transform unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter coder 111. The prediction parameter coder 111 is configured to include an inter prediction parameter coder 112 and an intra prediction parameter coder 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter coder 111. For example, in a case of an inter prediction, the prediction parameter input from the prediction parameter coder 111 is a motion vector. The prediction image generation unit 101 reads a block located at a position on a reference picture indicated by a motion vector with respect to a target PU. In a case of an intra prediction, the prediction parameter is, for example, an intra prediction mode. The prediction image generation unit 101 reads the pixel value of an adjacent PU used in the intra prediction mode from the reference picture memory 109, and generates a prediction image P of the PU. The prediction image generation unit 101 generates the prediction image P of the PU by using one prediction scheme among multiple prediction schemes for the read reference picture block. The prediction image generation unit 101 outputs the generated prediction image P of the PU to the subtraction unit 102.

Figure 7:
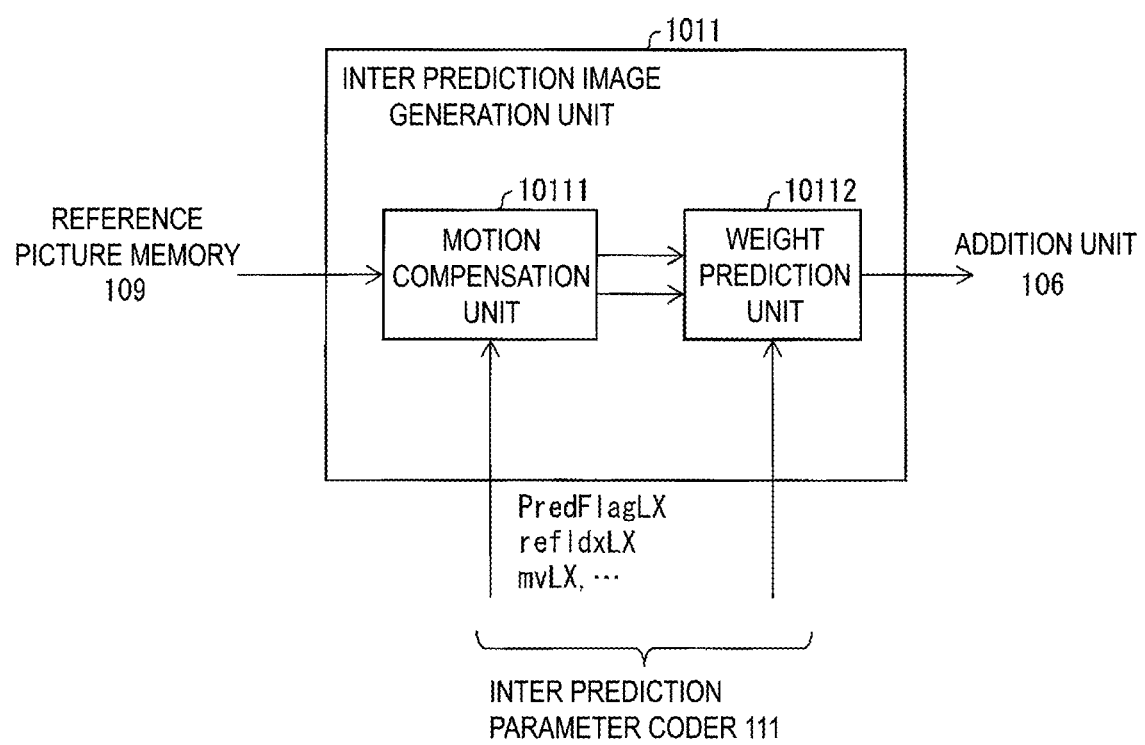
FIG. 7 is a block diagram illustrating a configuration of an inter prediction image generation unit of the image encoding device according to Embodiment 1.

Note that the prediction image generation unit 101 is an operation same as the prediction image generation unit 308 already described. For example, FIG. 7 is a block diagram illustrating a configuration of an inter prediction image generation unit 1011 included in the prediction image generation unit 101. The inter prediction image generation unit 1011 includes a motion compensation unit 10111 and a weight prediction unit 10112. Descriptions about the motion compensation unit 10111 and the weight prediction unit 10112 are omitted since the motion compensation unit 10111 and the weight prediction unit 10112 have configurations similar to those of the above-mentioned motion compensation unit 3091 and weight prediction unit 3094, respectively.

The prediction image generation unit 101 generates a prediction image P of the PU, based on a pixel value of a reference block read from the reference picture memory, by using a parameter input by the prediction parameter coder. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates a residual signal. The subtraction unit 102 outputs a generated residual signal to the transform and quantization unit 103.

The transform and quantization unit 103 performs frequency transform on the residual signal input from the subtraction unit 102 to calculate transform coefficients. The transform and quantization unit 103 quantizes the calculated transform coefficients to calculate quantization coefficients. The transform and quantization unit 103 outputs the calculated quantization coefficients to the entropy coder 104 and the inverse quantization and inverse transform unit 105.

To the entropy coder 104, the quantization coefficients are input from the transform and quantization unit 103, and coding parameters are input from the prediction parameter coder 111. For example, input coding parameters include codes such as a reference picture index refIdxLX, a prediction vector index mvp_LX_idx, a difference vector mvdLX, a prediction mode predMode, and a merge index merge_idx.

The entropy coder 104 performs entropy coding on the input quantization coefficients and coding parameters to generate a coding stream Te, and outputs the generated coding stream Te to the outside.

The inverse quantization and inverse transform unit 105 performs inverse quantization on the quantization coefficients input from the transform and quantization unit 103 to calculate transform coefficients. The inverse quantization and inverse transform unit 105 performs inverse frequency transform on the calculated transform coefficients to calculate residual signals. The inverse quantization and inverse transform unit 105 outputs the calculated residual signals to the addition unit 106.

The addition unit 106 adds, for each pixel, signal values of the prediction images P of the PUs input from the prediction image generation unit 101 and signal values of the residual signals input from the inverse quantization and inverse transform unit 105 for each pixel, to generate a decoded image. The addition unit 106 stores the generated decoded image in the reference picture memory 109.

The loop filter 107 performs a deblocking filter, a sample adaptive offset (SAO), and an adaptive loop filter (ALF) to the decoded image generated by the addition unit 106.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned prediction parameter or a parameter to be a target of coding generated associated with the prediction parameter. The prediction image generation unit 101 generates the prediction image P of the PUs by using each of the sets of these coding parameters.

The coding parameter determination unit 110 calculates cost values indicating a volume of an information quantity and coding errors for each of the multiple sets. For example, a cost value is a sum of a code amount and a value of multiplying a coefficient λ by a square error. The code amount is an information quantity of the coding stream Te obtained by performing entropy coding on a quantization error and a coding parameter. The square error is a sum of pixels for square values of residual values of residual signals calculated in the subtraction unit 102. The coefficient λ is a real number that is larger than a pre-configured zero. The coding parameter determination unit 110 selects a set of coding parameters by which the calculated cost value is minimized. With this configuration, the entropy coder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter coder 111 derives a format for coding from parameters input from the coding parameter determination unit 110, and outputs the format to the entropy coder 104. A derivation of a format for coding is, for example, to derive a difference vector from a motion vector and a prediction vector. The prediction parameter coder 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter coder 112 derives inter prediction parameters such as a difference vector, based on prediction parameters input from the coding parameter determination unit 110. The inter prediction parameter coder 112 includes a configuration partly identical to a configuration by which the inter prediction parameter decoder 303 (see FIG. 9 and the like) derives inter prediction parameters, as a configuration deriving parameters necessary for generation of a prediction image output to the prediction image generation unit 101.

The intra prediction parameter coder 113 derives a format for coding (for example, MPM_idx, rem_intra_luma_pred_mode, and the like) from the intra prediction mode IntraPredMode input from the coding parameter determination unit 110.

Embodiment 2

In Embodiment 1, the image encoding device 11 and the image decoding device 31 perform coding and decoding processing in units of subpicture sequences. However, the image encoding device 11 and the image decoding device 31 may code and decode subpictures in units of pictures, as in an image transmission system 2 according to the present embodiment.

Embodiment 2 will be described with reference to FIGS. 15 to 20 and 24. For the sake of convenience of description, members having the same functions as those of the members described in Embodiment 1 are denoted by the same reference signs, and descriptions thereof are omitted.

Figure 24:
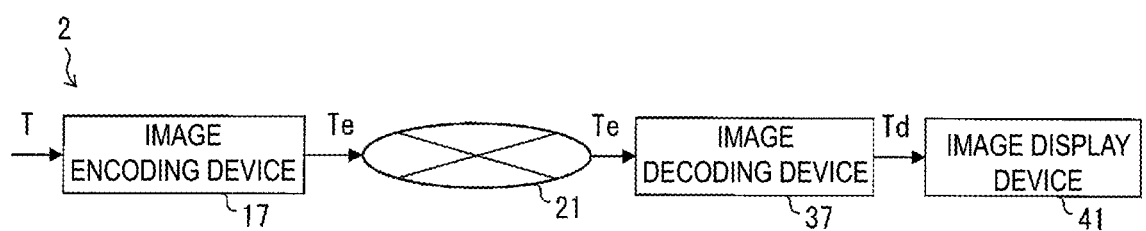
FIG. 24 is a schematic diagram illustrating a configuration of an image transmission system according to Embodiment 2.

FIG. 24 is a schematic diagram illustrating a configuration of the image transmission system 2 according to Embodiment 2.

As illustrated in FIG. 24, the image transmission system 2 includes an image encoding device 17 and an image decoding device 37 in place of the image encoding device 11 and the image decoding device 31 in Embodiment 1. The image transmission system 2 is otherwise configured similarly to the image transmission system 1.

Structure of Coding Stream Te

Figure 15:
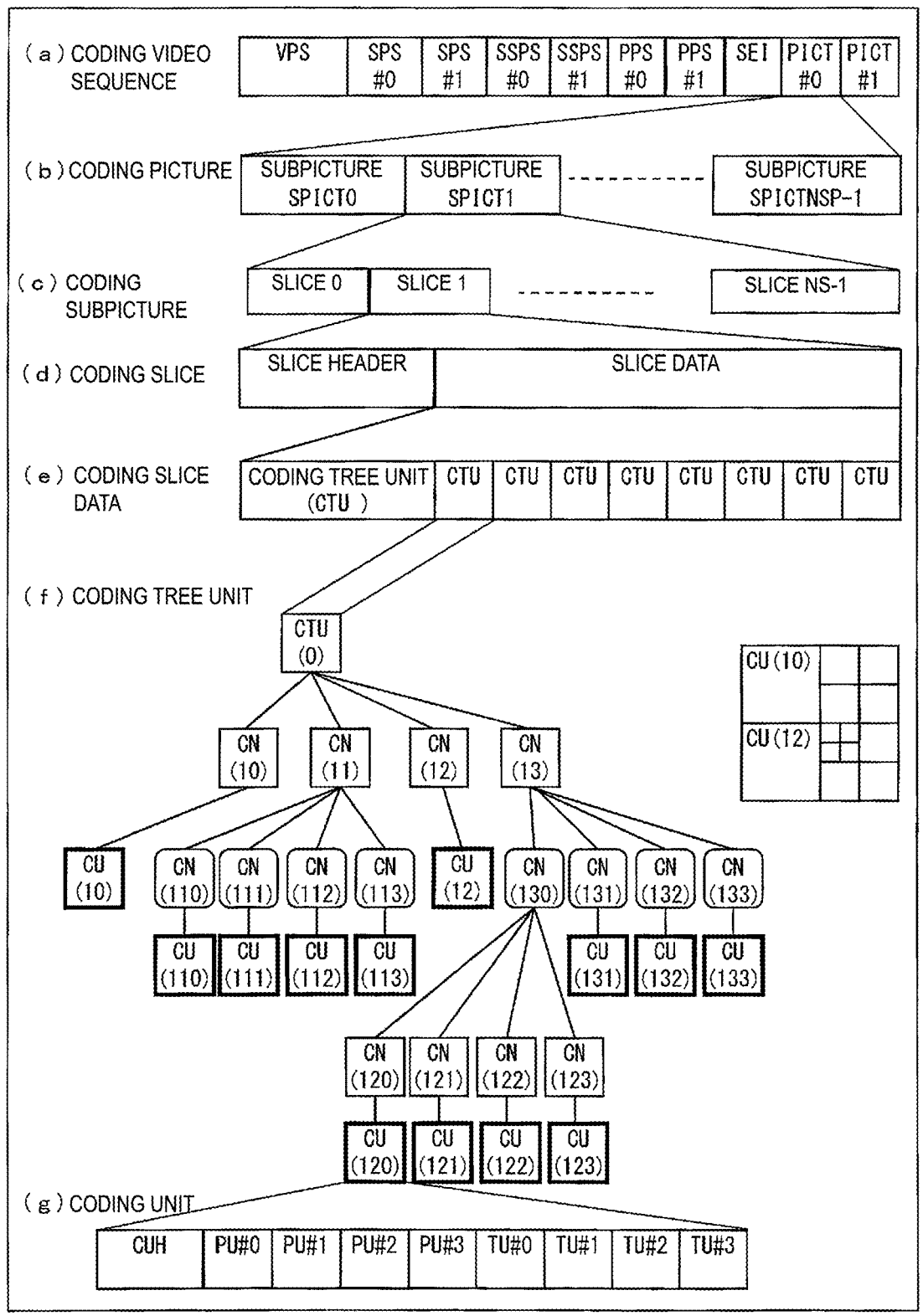
FIG. 15 is a diagram illustrating a hierarchy structure of a coding stream Te according to Embodiment 2.

FIG. 15 is a diagram illustrating a hierarchy structure of the coding stream Te in Embodiment 2. The coding stream Te includes a sequence and multiple pictures constituting the sequence illustratively. (a) of FIG. 15 is a coding video sequence prescribing a sequence SEQ. (b) of FIG. 15 is a diagram illustrating a coded picture prescribing a picture PICT. Note that (c) to (g) of FIG. 15 are the same as (c) to (g) of FIG. 1, and thus descriptions thereof are omitted.

Coding Video Sequence

In the coding video sequence, a set of data referred to by the image decoding device 31 to decode a sequence SEQ to be processed is prescribed. The sequence SEQ includes a video parameter set VPS, sequence parameter sets SPSs, subpicture sequence parameter sets SSPSs, picture parameter sets PPSs, pictures PICTs, and supplemental enhancement information SEI, as illustrated in (a) of FIG. 15. Here, a value indicated after # indicates a layer ID. In FIG. 15, although an example is illustrated where coded data of #0 and #1, in other words, coded data of layer 0 and layer 1 are present, the types and number of layers are not limited to these.

Coded Picture

In the coded picture, a set of data referred to by the image decoding device 31 to decode a picture PICT to be processed is prescribed. As illustrated in (b) of FIG. 15, the picture PICT includes subpictures $SPICT_0$ to $SPICT_{NSP-1}$ (NSP is the total number of subpictures included in the picture PICT).

Note that the total number of subpictures may be prescribed by limitation based on the capability of the image decoding device 37 prescribed by the profile, the level, and the like.

Configuration of Image Decoding Device

Figure 18:
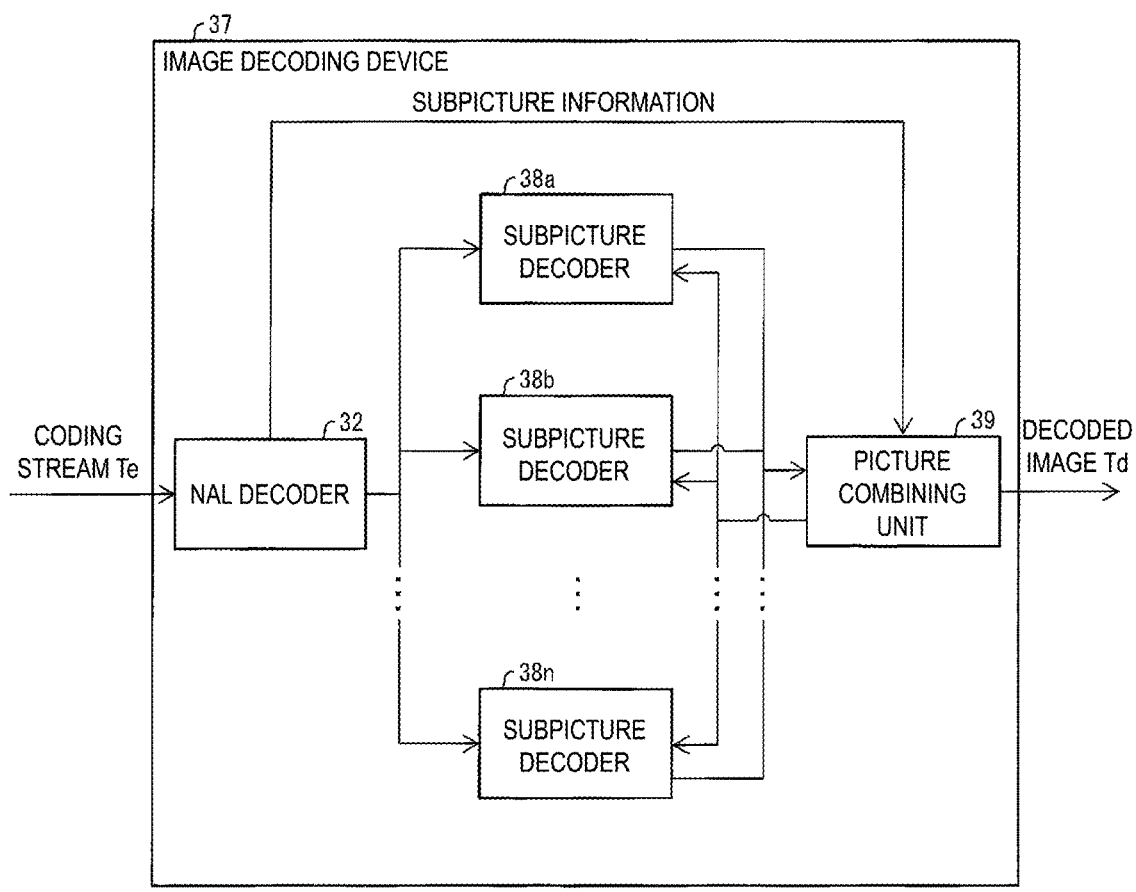
FIG. 18 is a block diagram illustrating a configuration of an image decoding device according to Embodiment 2.

A configuration of the image decoding device 37 according to the present embodiment will now be described. FIG. 18 is a block diagram illustrating the configuration of the image decoding device 37 according to the present embodiment.

The image decoding device 37 includes subpicture decoders 38a to 38n and a picture combining unit 39 in place of the subpicture decoders 33a to 33n and the picture combining unit 36 in Embodiment 1. The image decoding device 37 is otherwise configured similarly to the image decoding device 31.

The subpicture decoders 38a to 38n decode a coding stream related to subpictures into the respective subpictures.

Note that, unlike the subpicture decoders 33a to 33n in Embodiment 1, the subpicture decoders 38a to 38n intend, for decoding processing, one independent picture instead of one independent video sequence. The subpicture decoders 38a to 38n do not refer to inter-subpicture prediction information in the spatial direction, but may refer to inter-subpicture prediction information in the time direction. Accordingly, the subpicture decoders 38a to 38n can decode the subpictures more efficiently than the subpicture decoders 33a to 33n.

The picture combining unit 39 composes multiple subpictures decoded by the subpicture decoders 38a to 38n into a picture within a decoding loop with overlapping of the subpictures allowed, to generates a reference picture (a picture resulting from composing of multiple subpictures).

Subsequently, the subpicture decoders 38a to 38n refer to the reference picture generated by the picture combining unit 39 to decode the respective subpictures.

The picture combining unit 39 composes the decoded subpictures within the decoding loop to generate a decoded image Td.

As described above, in the image decoding device 37 according to Embodiment 2, the picture combining unit 39 composes the temporarily decoded subpictures into a picture, and the subpicture decoders 38a to 38n refer to the picture to decode the subpictures.

According to this configuration, the image decoding device 37 can efficiently decode the subpictures in parallel and independently in units of pictures.

Configuration of Subpicture Decoder

Figure 19:
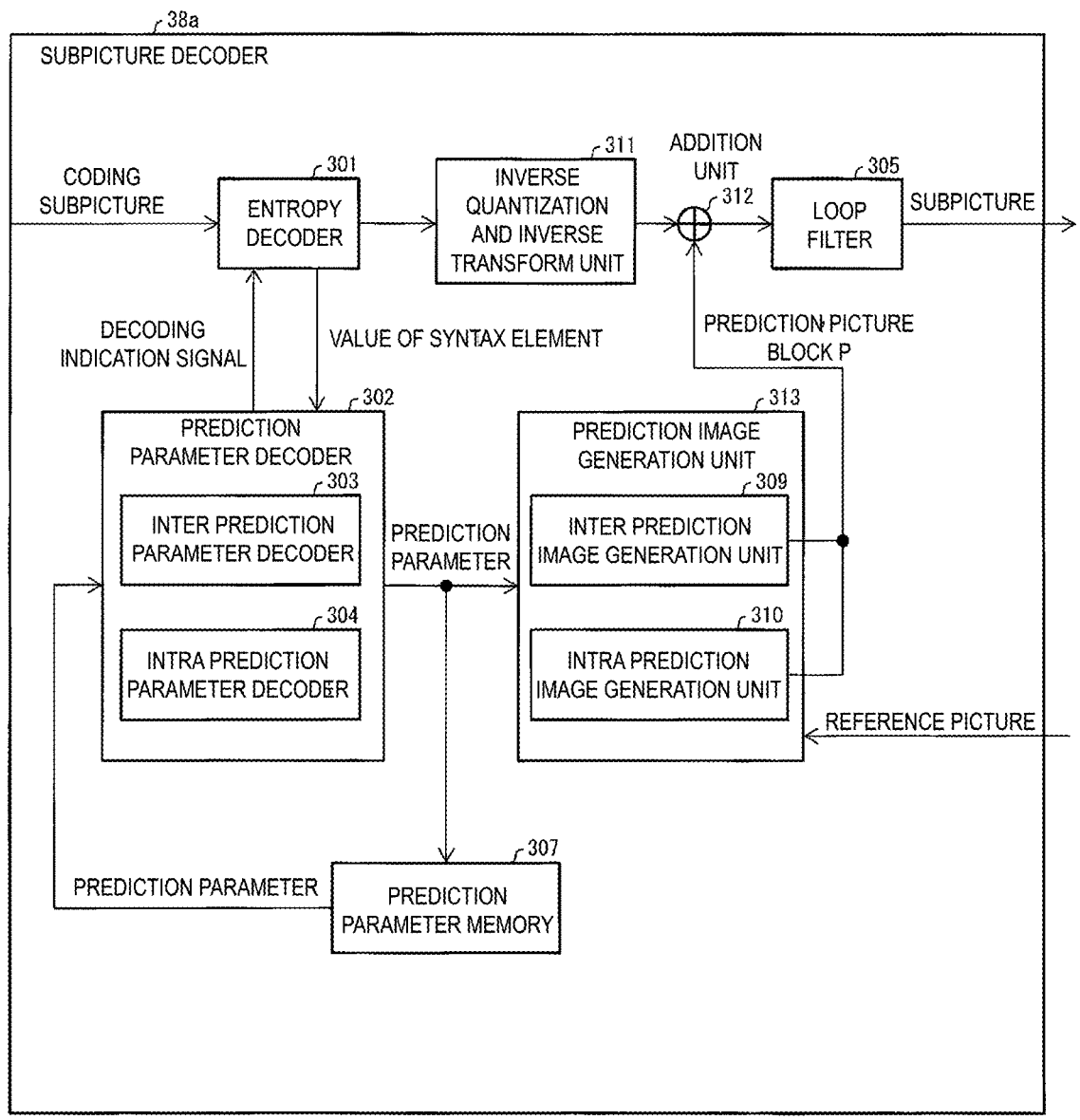
FIG. 19 is a block diagram illustrating a configuration of a subpicture decoder in the image decoding device according to Embodiment 2.

A configuration of each of the subpicture decoders 38a to 38n will be described. As an example, the configuration of the subpicture decoder 38a will be described using FIG. 19. FIG. 19 is a block diagram illustrating the configuration of the subpicture decoder 38a.

The subpicture decoder 38a does not include the reference picture memory 306 in the subpicture decoders 33a of Embodiment 1, and includes a prediction image generation unit 313 instead of the prediction image generation unit 308 in Embodiment 1. The subpicture decoder 38a is otherwise configured similarly to the subpicture decoder 33a.

As illustrated in FIG. 19, the prediction image generation unit 313 refers to the reference picture generated by the picture combining unit 39 composing the subpictures in place of the reference picture stored in the reference picture memory 306 in Embodiment 1, to generate the prediction image. The prediction image generation unit 313 otherwise generates the prediction image similarly to the prediction image generation unit 308.

In this way, the prediction image generation unit 313 can generate the prediction image similarly to the prediction image generation unit 308 because the prediction image generation unit 313 refers to the reference picture generated by the picture combining unit 39 compositing the subpictures.

Example of Composition by Picture Combining Unit 39

An example of composition by the picture combining unit 39 will be described in detail below using FIG. 20.

FIG. 20 is a diagram illustrating an example of the syntax included in the picture parameter set PPS referred to by the picture combining unit 39.

The picture combining unit 39 refers to the syntax included in the picture parameter set PPS as illustrated in FIG. 20. Subsequently, the picture combining unit 39 composes multiple subpictures into a picture with overlapping of the subpictures allowed.

Note that, in a case that a gap is formed between the subpictures, that is, in a case that the pixels in the picture are not included in all of the subpictures, the picture combining unit 36 may fill the gap with a prescribed pixel value. The picture combining unit 36 may use, for overlapping pixels, the weighted average value of pixel values at the same pixel position among the subpictures. In a case that three or more pixels overlap, the picture combining unit 36 may compose the subpictures using a value selected from multiple values using a median value or a middle value.

For the method of generating an image in the picture combining unit 39, the same method is used for the coding side and the decoding side because the generation is within the decoding loop. To achieve this, specific syntax may be provided by the picture parameter set PPS, and the method may be switched among multiple methods.

Here, the pieces of the syntax illustrated in FIG. 20 are similar to the syntax included in the subpicture sequence parameter set SSPS or the sequence parameter set SPS in Embodiment 1, except that the pieces of the syntax in FIG. 20 are included in the picture parameter set PPS.

Thus, the picture combining unit 39 composes multiple subpictures with reference to the syntax included in the picture parameter set PPS and indicating the position of each subpicture. Accordingly, the positions of the subpictures to be composed can be identified.

The picture combining unit 39 composes multiple subpictures with reference to the syntax included in the picture parameter set PPS and indicating the size of each subpicture. Accordingly, the sizes of the subpictures to be composed can be identified.

The picture combining unit 39 composes multiple subpictures with reference to the syntax included in the picture parameter set PPS and indicating the offset of each subpicture. This allows identification of the offsets of the subpictures to be composed.

Configuration of Image Encoding Device

Figure 16:
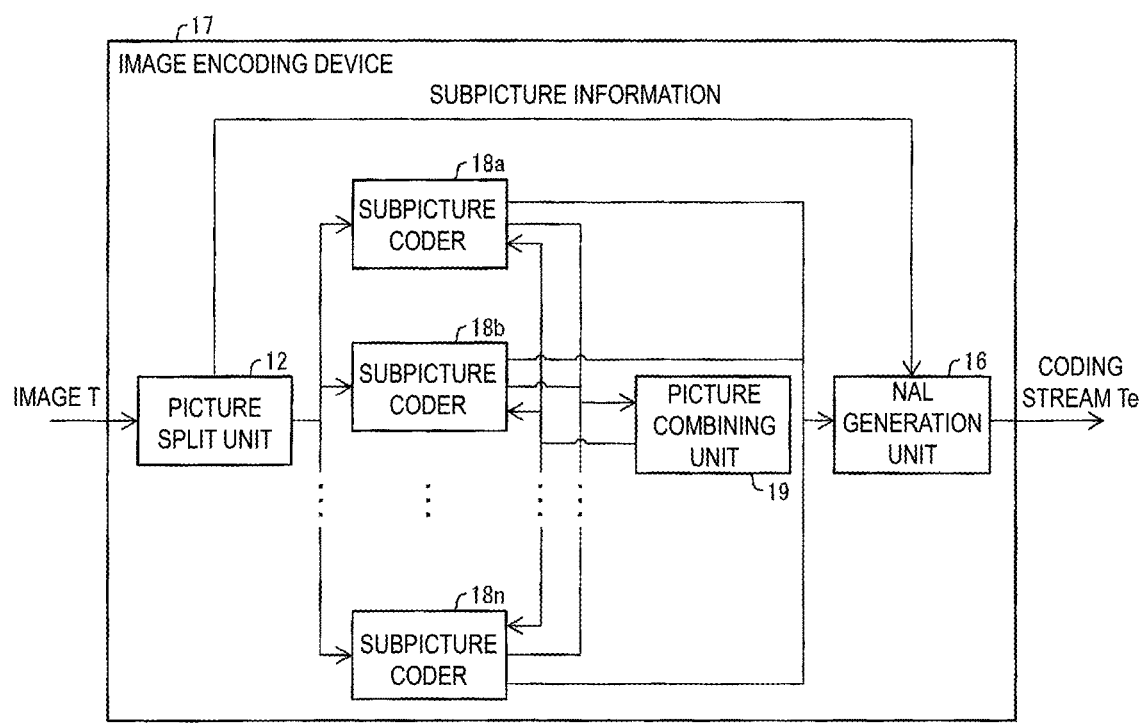
FIG. 16 is a block diagram illustrating a configuration of an image encoding device according to Embodiment 2.

A configuration of the image encoding device 17 according to the present embodiment will now be described. FIG. 16 is a block diagram illustrating a configuration of the image encoding device 17 according to the present embodiment.

The image encoding device 17 includes subpicture coders 18a to 18n instead of the subpicture coders 13a to 13n in Embodiment 1, and further includes a picture combining unit 19. The image encoding device 17 is otherwise configured similarly to the image encoding device 11.

The subpicture coders 18a to 18n code subpictures allowed to overlap with one another.

Note that, unlike the 13a to 13n in Embodiment 1, the subpicture coders 18a to 18n intend, for coding processing, one independent picture instead of one independent video sequence. The subpicture coders 18a to 18n do not refer to inter-subpicture prediction information in the spatial direction, but may refer to inter-subpicture prediction information in the time direction. Accordingly, the subpicture coders 18a to 18n can code the subpictures more efficiently than the subpicture coders 13a to 13 n.

The picture combining unit 19 composes the locally decoded subpictures to generate a reference picture.

Subsequently, the subpicture coders 18a to 18n refer to the reference picture generated by the picture combining unit 19, code the respective subpictures, and transmit the coded subpictures to the NAL generation unit 16.

The NAL generation unit 16 generates a coding stream Te coded in NAL units by using the subpicture information transmitted from the picture split unit 12 and the coding subpictures coded by the subpicture coders 18a to 18n.

Thus, in the image encoding device 17, the picture combining unit 19 composes the temporarily coding subpictures to generate a reference picture, and the subpicture coders 18a to 18n refer to the reference picture to code the subpictures.

Accordingly, the image encoding device 17 can efficiently code the subpictures in parallel and independently in units of pictures.

Configuration of Subpicture Coder

Figure 17:
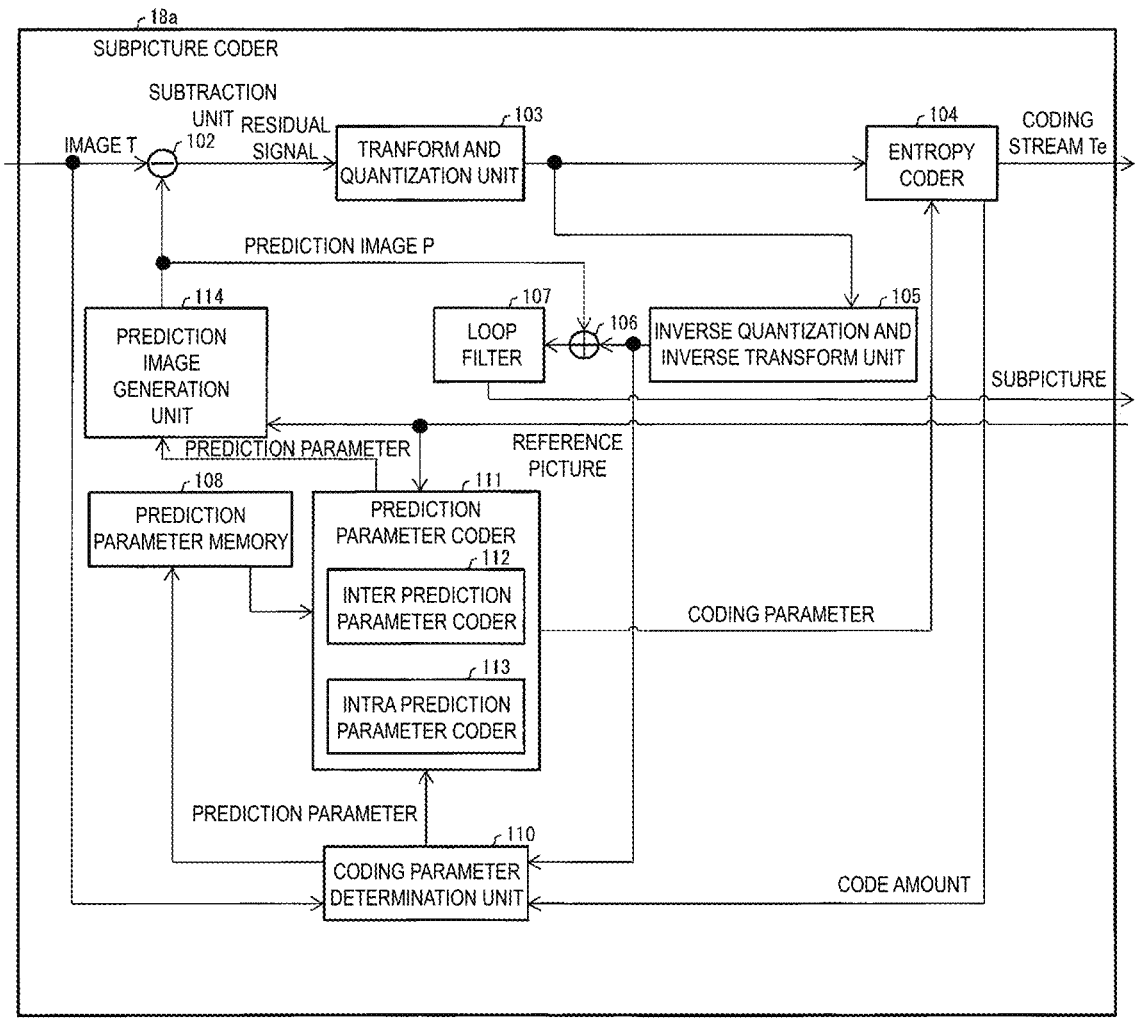
FIG. 17 is block diagram illustrating a configuration of a subpicture coder in the image encoding device according to Embodiment 2.

Now, a configuration of each of the subpicture coders 18a to 18n will be described. As an example, the configuration of the subpicture coder 18a will be described with reference to FIG. 17. FIG. 17 is a block diagram illustrating the configuration of the subpicture coder 18a.

The subpicture coder 18a does not include the reference picture memory 109 in Embodiment 1, and includes a prediction image generation unit 114 instead of the prediction image generation unit 101 in Embodiment 1. The prediction image generation unit 114 is otherwise configured similarly to the prediction image generation unit 101.

As illustrated in FIG. 17, instead of reading decoded blocks stored in the reference picture memory 109 in Embodiment 1, the prediction image generation unit 114 refers to the reference picture generated by the picture combining unit 19 to generate a prediction image.

In this way, by referring to the reference picture generated by the picture combining unit 19, the prediction image generation unit 114 can generate the prediction image similarly to the prediction image generation unit 101.

Supplemental Note

Note that a computer may be used to implement parts of the image encoding devices 11 and 17 and the image decoding devices 31 and 37 in Embodiments 1 and 2 described above, for example, the entropy decoder 301, the prediction parameter decoder 302, the loop filter 305, the prediction image generation unit 308, the inverse quantization and inverse transform unit 311, the addition unit 312, the prediction image generation unit 101, the subtraction unit 102, the transform and quantization unit 103, the entropy coder 104, the inverse quantization and inverse transform unit 105, the loop filter 107, the coding parameter determination unit 110, and the prediction parameter coder 111. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into any of the image encoding devices 11 and 17 and the image decoding devices 31 and 37, and the computer system includes an OS and hardware components such as a peripheral apparatus. The "computer-readable recording medium" refers to a portable medium such as a flexible disk, a magneto-optical disk, a ROM, and a CD-ROM, and a storage apparatus such as a hard disk built into the computer system. The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. The program may be configured to realize some of the functions described above, and also may be configured to be capable of realizing the functions described above in combination with a program already recorded in the computer system.

Part or all of the image encoding devices 11 and 17 and the image decoding devices 31 and 37 in the embodiments described above may be realized as an integrated circuit such as a Large Scale Integration (LSI). Each function block of the image encoding devices 11 and 17 and the image decoding devices 31 and 37 may be individually realized as processors, or part or all may be integrated into processors. A circuit integration technique is not limited to the LSI, and may be realized with a dedicated circuit or a general-purpose processor. Furthermore, in a case that advances in semiconductor technology lead to the advent of a circuit integration technology that replaces an LSI, an integrated circuit based on the circuit integration technology may be used.

The embodiment of the disclosure has been described in detail above referring to the drawings, but the specific configuration is not limited to the above embodiments and various amendments can be made to a design that fall within the scope that does not depart from the gist of the disclosure.

Application Examples

The above-mentioned image encoding devices 11 and 17 and the image decoding devices 31 and 37 can be utilized being installed to various apparatuses performing transmission, reception, recording, and reproduction of videos. Note that, videos may be natural videos imaged by cameras or the like, or may be artificial videos (including CG and GUI) generated by computers or the like.

First, with reference to FIG. 21, a configuration will be described in which the above-mentioned image encoding devices 11 and 17 and the image decoding devices 31 and 37 can be utilized for transmission and reception of videos.

Figure 21:
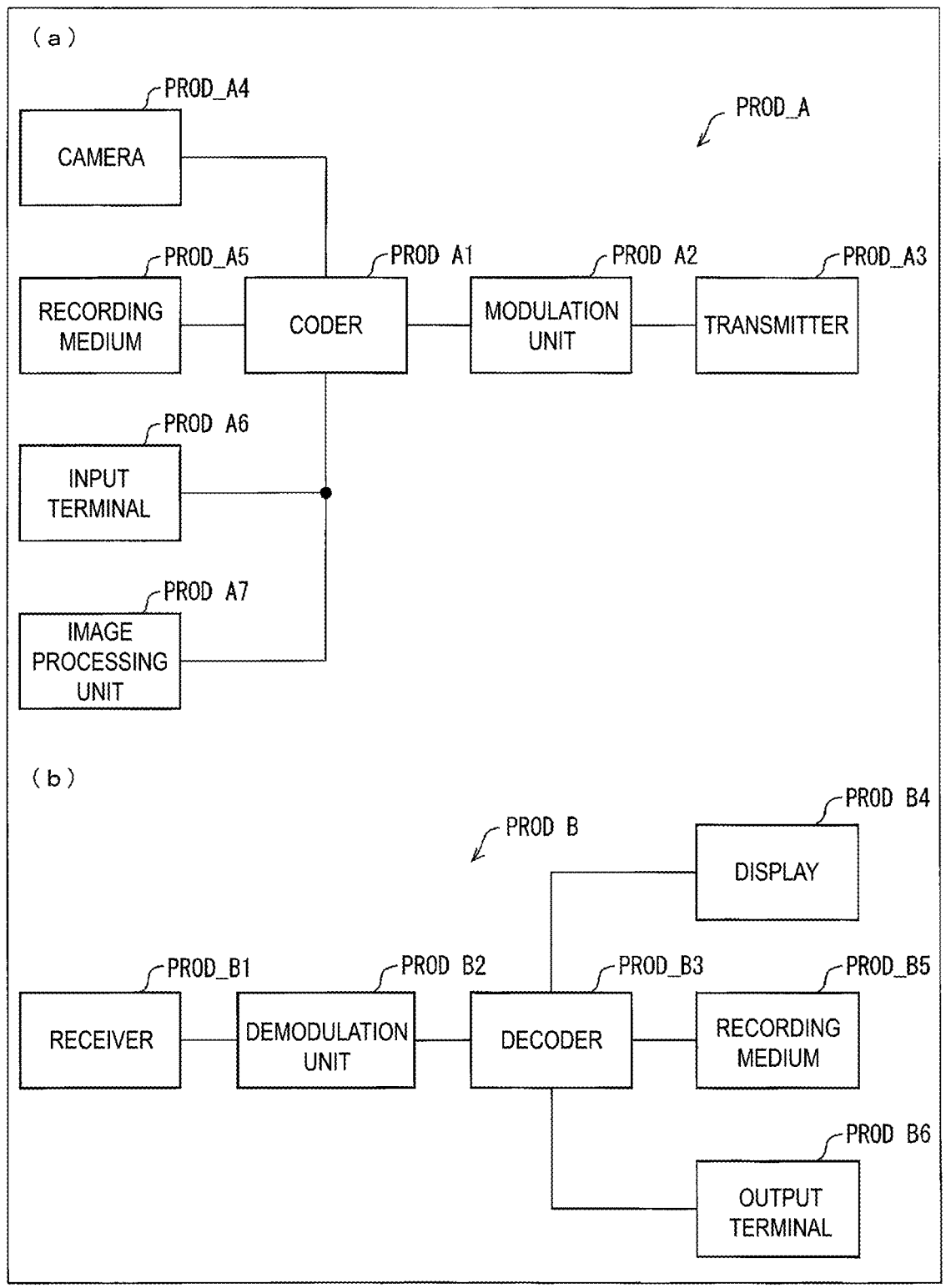
FIG. 21 is a diagram illustrating configurations of a transmission device equipped with the image encoding device according to Embodiments 1 and 2 and a reception device equipped with the image decoding device according to Embodiments 1 and 2. (a) of FIG. 21 illustrates the transmission device equipped with the image encoding device, and (b) of FIG. 21 illustrates the reception device equipped with the image decoding device.

(a) of FIG. 21 is a block diagram illustrating a configuration of a transmission device PROD_A installed with the image encoding device 11 or 17. As illustrated in (a) of FIG. 21, the transmission device PROD_A includes a coder PROD_A1 which obtains coded data by coding videos, a modulation unit PROD_A2 which obtains modulating signals by modulating carrier waves with the coded data obtained by the coder PROD_A1, and a transmitter PROD_A3 which transmits the modulating signals obtained by the modulation unit PROD_A2. The above-mentioned image encoding device 11 or 17 is utilized as the coder PROD_A1.

The transmission device PROD_A may further include a camera PROD_A4 imaging videos, a recording medium PROD_A5 in which videos are recorded, an input terminal PROD_A6 for receiving videos from the outside, and an image processing unit A7 which generates or processes images, as supply sources of the videos input into the coder PROD_A1. (a) of FIG. 21 illustrates the configuration in which the transmission device PROD_A includes all of the above-described components. However, some of the components may be omitted.

Note that, in the recording medium PROD_A5, videos which are not coded may be recorded or videos may be recorded which are coded in a coding scheme for recording different than a coding scheme for transmission. In the latter case, a decoder (not illustrated) to decode coded data read from the recording medium PROD_A5 according to coding scheme for recording may be interposed between the recording medium PROD_A5 and the coder PROD_A1.

(b) of FIG. 21 is a block diagram illustrating a configuration of a reception device PROD_B installed with the image decoding device 31 or 37. As illustrated in (b) of FIG. 21, the reception device PROD_B includes a receiver PROD_B1 which receives modulating signals, a demodulation unit PROD_B2 which obtains coded data by demodulating the modulating signals received by the receiver PROD_B1, and a decoder PROD_B3 which obtains videos by decoding the coded data obtained by the demodulation unit PROD_B2. The above-mentioned image decoding device 31 or 37 is utilized as the decoder PROD_B3.

The reception device PROD_B may further include a display PROD_B4 displaying videos, a recording medium PROD_B5 in which the videos are recorded, and an output terminal PROD_B6 to output videos outside, as supply destinations of the videos output by the decoder PROD_B3. (b) of FIG. 21 illustrates the configuration in which the reception device PROD_B includes all of the above-described components. However, some of the components may be omitted.

Note that, in the recording medium PROD_B5, videos which are not coded may be recorded, or videos may be recorded which are coded in a coding scheme for recording different from a coding scheme for transmission. In the latter case, a coder (not illustrated) to code videos acquired from the decoder PROD_B3 according to a coding scheme for recording may be interleaved between the decoder PROD_B3 and the recording medium PROD_B5.

Note that the transmission medium transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand).

Thus, the transmission of the modulating signals may be realized by any of radio broadcasting, cable broadcasting, radio communication, and cable communication.

For example, a broadcasting station (broadcasting equipment or the like)/receiving station (television receiver or the like) of digital terrestrial television broadcasting is an example of the transmission device PROD_A/reception device PROD_B transmitting and/or receiving modulating signals in radio broadcasting. A broadcasting station (broadcasting equipment or the like)/receiving station (television receiver or the like) of cable television broadcasting is an example of the transmission device PROD_A/reception device PROD_B transmitting and/or receiving modulating signals in cable broadcasting.

Servers (work station and the like)/clients (television receivers, personal computers, smartphones, and the like) for Video On Demand (VOD) services, video hosting services using the Internet and the like are examples of the transmission device PROD_A/reception device PROD_B transmitting and/or receiving modulating signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. In other words, a client of a video hosting service functions as both the transmission device PROD_A and the reception device PROD_B.

Now, with reference to FIG. 22, a configuration will be described in which the above-mentioned image encoding devices 11 and 17 and the image decoding devices 31 and 37 can be utilized for recording and reproduction of videos.

Figure 22:
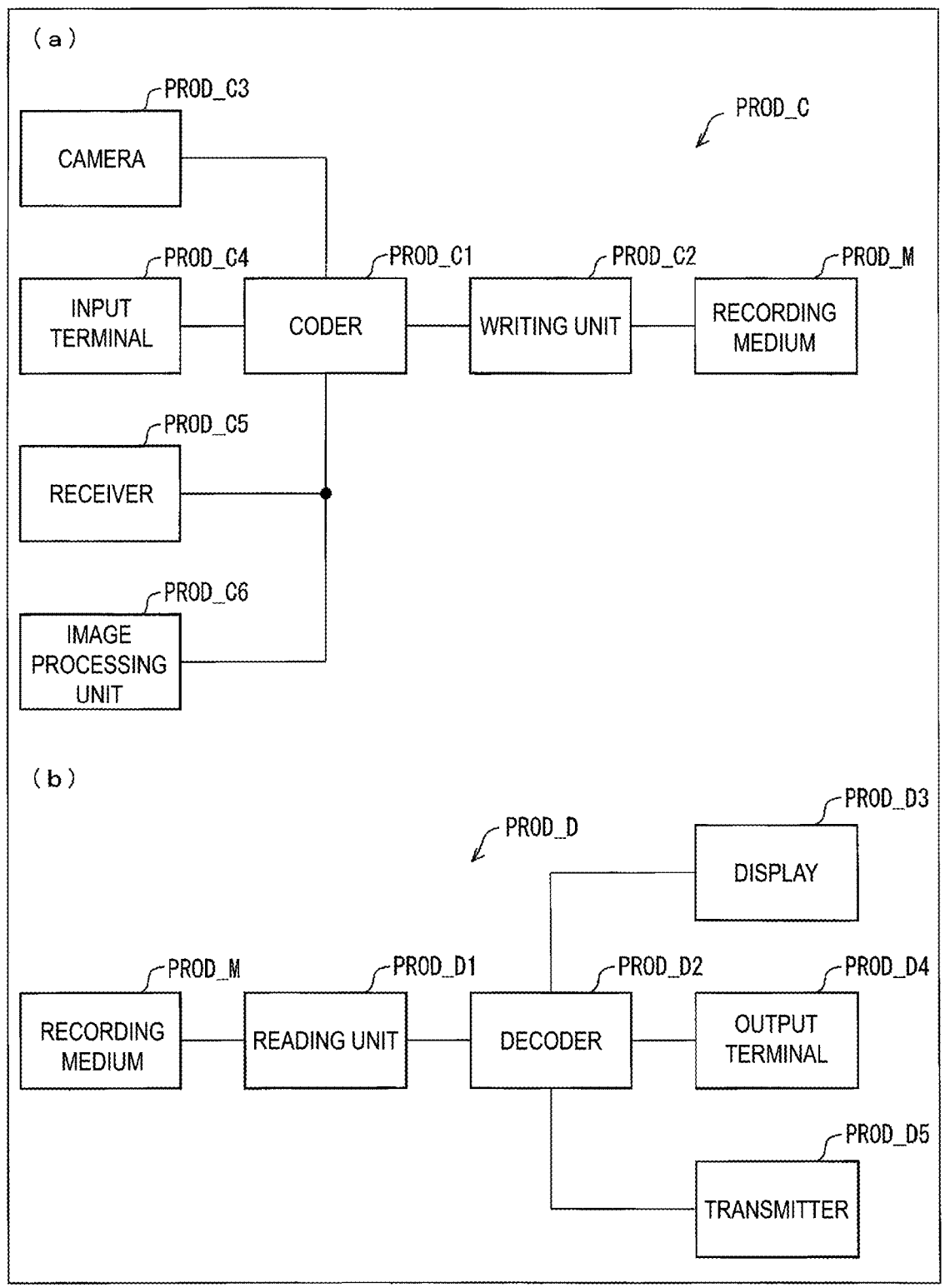
FIG. 22 is a diagram illustrating configurations of a recording apparatus equipped with the image encoding device according to Embodiments 1 and 2 and a reproduction apparatus equipped with the image decoding device according to Embodiments 1 and 2. (a) of FIG. 22 illustrates the recording apparatus equipped with the image encoding device, and (b) of FIG. 22 illustrates the reproduction apparatus equipped with the image decoding device.

(a) of FIG. 22 is a block diagram illustrating a configuration of a recording apparatus PROD_C installed with the above-mentioned image encoding device 11 or 17. As illustrated in (a) of FIG. 22, the recording apparatus PROD_C includes a coder PROD_C1 which obtains coded data by coding a video, and a writing unit PROD_C2 which writes the coded data obtained by the coder PROD_C1 in a recording medium PROD_M. The above-mentioned image encoding device 11 or 17 is utilized as the coder PROD_C1.

Note that the recording medium PROD_M may be of a type contained in the recording apparatus PROD_C, such as (1) a Hard Disk Drive (HDD), a Solid State Drive (SSD), and the like. The recording medium PROD_M may be of a type connected to the recording apparatus PROD_C, such as (2) a SD memory card, a Universal Serial Bus (USB) flash memory, or the like. The recording medium PROD_M may be loaded into a drive device (not illustrated) built into the recording apparatus PROD_C, such as (3) a Digital Versatile Disc (DVD), a Blu-ray Disc (BD: trade name), or the like.

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as supply sources of the video input into the coder PROD_C1. (a) of FIG. 22 illustrates the configuration in which the recording apparatus PROD_C includes all of the above-described components. However, some of the components may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interposed between the receiver PROD_C5 and the coder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main supply source of a video). Other examples of such recording apparatus PROD_C include a camcorder (in this case, the camera PROD_C3 is the main supply source of a video), a personal computer (in this case, the receiver PROD_C5 or the image processing unit C6 is the main supply source of a video), a smartphone (in this case, the camera PROD_C3 or the receiver PROD_C5 is the main supply source of a video), and the like.

(b) of FIG. 22 is a block illustrating a configuration of a reproduction apparatus PROD_D installed with the above-mentioned image decoding device 31 or 37. As illustrated in (b) of FIG. 22, the reproduction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned image decoding device 31 or 37 is utilized as the decoder PROD_D2.

Note that the recording medium PROD_M may be of a type contained in the reproduction apparatus PROD_D, such as (1) an HDD, an SSD, or the like. The recording medium PROD_M may be of a type connected to the reproduction apparatus PROD_D, such as (2) a SD memory card, USB flash memory, or the like. The recording medium PROD_M may be loaded into a drive device (not illustrated) built into the reproduction apparatus PROD_D, such as (3) a DVD, a BD, or the like.

The reproduction apparatus PROD_D may further include a display PROD_D3 displaying a video, an output terminal PROD_D4 to output the video to the outside, and a transmitter PROD_D5 which transmits the video, as the supply destination of the video output by the decoder PROD_D2. (b) of FIG. 22 illustrates the configuration in which the reproduction apparatus PROD_D includes all of the above-described components. However, some of the components may be omitted.

Note that the transmitter PROD_D5 may transmit a video which is not coded, or may transmit coded data coded in a coding scheme for transmission different than a coding scheme for recording. In the latter case, a coder (not illustrated) to code a video in a coding scheme for transmission may be interposed between the decoder PROD_D2 and the transmitter PROD_D5.

Examples of such reproduction apparatus PROD_D include a DVD player, a BD player, an HDD player, and the like (in this case, the output terminal PROD_D4 to which a television receiver, and the like is connected is the main supply destination of the video). Other examples of the reproduction apparatus PROD_D include a television receiver (in this case, the display PROD_D3 is the main supply destination of the video), a digital signage (also referred to as an electronic signboard or an electronic bulletin board, and the like, the display PROD_D3 or the transmitter PROD_D5 is the main supply destination of the video), a desktop PC (in this case, the output terminal PROD_D4 or the transmitter PROD_D5 is the main supply destination of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), and the like.

Realization as Hardware and Realization as Software

Each block of the above-mentioned image decoding devices 31 and 37 and the image encoding devices 11 and 17 may be realized as hardware by a logical circuit formed on an integrated circuit (IC chip). Each block of the above-mentioned image decoding devices 31 and 37 and the image encoding devices 11 and 17 may be realized as software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the embodiments of the disclosure can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disks and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical memory card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the disclosure can be also realized in the form of computer data signals embedded in a carrier wave where the program code is embodied by electronic transmission.

The embodiments of the disclosure are not limited to the above-mentioned embodiments, and various modifications are possible within the scope of the claims. Thus, embodiments obtained by combining technical means modified appropriately within the scope defined by claims are included in the technical scope of the disclosure.

CROSS-REFERENCE OF RELATED APPLICATION

This application claims the benefit of priority to JP 2017-108758 filed on May 31, 2017, which is incorporated herein by reference in its entirety.

INDUSTRIAL APPLICABILITY

The embodiments of the disclosure can be preferably applied to an image decoding device to decode coded data where image data is coded, and an image encoding device to generate coded data where image data is coded. The embodiments of the disclosure can be preferably applied to a data structure of coded data generated by the image encoding device and referred to by the image decoding device.

REFERENCE SIGNS LIST 11, 17 Image encoding device (video encoding device)
12 Picture split unit
13a to 13n, 18a to 18n Subpicture coder
31, 37 Image decoding device (video decoding device)
33a to 33n, 38a to 38n Subpicture decoder
19, 36, 39 Picture combining unit

The invention claimed is:

1. A video decoding device comprising:
at least one processor; and
a storage device coupled to the at least one processor and storing a program which, when executed by the at least one processor, causes the at least one processor to:
decode subpictures of a picture;
determine, based on an enable flag included in a sequence parameter set, whether syntax of the sequence parameter set indicates sizes and positions of the subpictures; and
combine the decoded subpictures into the picture with reference to the syntax when the syntax of the sequence parameter set indicates the sizes and positions of the subpictures.

2. The video decoding device according to claim 1, wherein the syntax further indicates offsets of the subpictures.

3. A video encoding device comprising:
at least one processor; and
a storage device coupled to the at least one processor and storing a program which, when executed by the at least one processor, causes the at least one processor to:
split a picture into subpictures; and
code each of the subpictures to generate an enable flag included in a sequence parameter set of coded data, the enable flag indicating whether syntax included in the sequence parameter set of coded data indicates sizes and positions of the subpictures.

4. The video decoding device according to claim 1, wherein the sizes of the subpictures are different from a size of the picture.

5. The video decoding device according to claim 1, wherein the sizes of the subpictures include widths and heights of the subpictures.

6. The video decoding device according to claim 1, wherein the positions of the subpictures include positions of pixels at a left end of the subpictures and positions of pixels at a top end of the subpictures.

* * * * *